(12) United States Patent
Korjus et al.

(10) Patent No.: US 11,532,228 B2
(45) Date of Patent: Dec. 20, 2022

(54) METHOD AND SYSTEM FOR TRAFFIC LIGHT SIGNAL DETECTION AND USAGE

(71) Applicant: STARSHIP TECHNOLOGIES OÜ, Tallinn (EE)

(72) Inventors: Kristjan Korjus, Tallinn (EE); Sergii Kharagorgiiev, Tallinn (EE); Rasmus Raag, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 0 days.

(21) Appl. No.: 17/269,364

(22) PCT Filed: Aug. 1, 2019

(86) PCT No.: PCT/EP2019/070808
§ 371 (c)(1),
(2) Date: Feb. 18, 2021

(87) PCT Pub. No.: WO2020/038699
PCT Pub. Date: Feb. 27, 2020

(65) Prior Publication Data
US 2021/0343143 A1    Nov. 4, 2021

(30) Foreign Application Priority Data

Aug. 22, 2018  (EP) .................... 18190327

(51) Int. Cl.
*G08G 1/095*   (2006.01)
*G06N 3/02*    (2006.01)
(Continued)

(52) U.S. Cl.
CPC ............... *G08G 1/095* (2013.01); *G06N 3/02* (2013.01); *G06V 20/584* (2022.01); *G08G 1/094* (2013.01); *G08G 1/097* (2013.01)

(58) Field of Classification Search
CPC ........ G08G 1/095; G08G 1/094; G08G 1/097; G06V 20/584; G06N 3/02
See application file for complete search history.

(56) References Cited

U.S. PATENT DOCUMENTS 4,549,841 A   10/1985  Ishige
5,664,928 A    9/1997  Stauber
(Continued)

FOREIGN PATENT DOCUMENTS

WO   2017064202 A1   4/2017
WO   2011035839      12/2018

OTHER PUBLICATIONS

Baker: "Automated Street Crossing for Assistive Robots" Proceedings of the 2005 IEEE Jun. 28-Jul. 1, 2005, Published in: 9th International Conference on Rehabilitation Robotics, 2005. ICORR 2005, Chicago, IL, USA (6 pgs).
(Continued)

*Primary Examiner* — Mohamed Barakat
(74) *Attorney, Agent, or Firm* — Siritzky Law, PLLC

(57) ABSTRACT

A method comprising a data processing device predicting a time for a future state change of a first traffic light; a method comprising a data processing device generating a map of traffic lights, wherein the map of traffic lights comprises a location of at least one localization traffic light, and methods combining these methods, and to corresponding systems.

18 Claims, 9 Drawing Sheets

(51) Int. Cl.
*G08G 1/09* (2006.01)
*G08G 1/097* (2006.01)
*G06V 20/58* (2022.01)

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,320,289 | B1 | 1/2008 | Clarke et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,844,879 | B1 | 12/2017 | Cousins et al. |
| 2003/0165373 | A1 | 9/2003 | Felder et al. |
| 2005/0207876 | A1 | 9/2005 | Springwater |
| 2006/0237239 | A1 | 10/2006 | Bruner et al. |
| 2011/0037619 | A1* | 2/2011 | Ginsberg ............... G08G 1/095 340/910 |
| 2011/0115646 | A1* | 5/2011 | Matsumura ...... G08G 1/096716 340/907 |
| 2012/0090110 | A1 | 4/2012 | Van Den Berg et al. |
| 2012/0101632 | A1* | 4/2012 | Ha ........................ B25J 9/1682 901/1 |
| 2013/0110281 | A1 | 5/2013 | Jones et al. |
| 2013/0332021 | A1 | 12/2013 | Goren |
| 2014/0136414 | A1 | 5/2014 | Abhyanker |
| 2014/0185880 | A1* | 7/2014 | Fairfield .............. G05D 1/0212 382/104 |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0070195 | A1 | 3/2015 | Gaines et al. |
| 2015/0100152 | A1 | 4/2015 | Trevino et al. |
| 2015/0183581 | A1 | 7/2015 | Worsley |
| 2015/0379468 | A1 | 12/2015 | Harvey |
| 2016/0122956 | A1* | 5/2016 | Christiansen ........ G08G 1/0955 180/2.2 |
| 2016/0185466 | A1 | 6/2016 | Dreano, Jr. |
| 2016/0207710 | A1 | 7/2016 | Conrad et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1* | 1/2017 | Tokuyama ............. G05D 1/024 |
| 2017/0084172 | A1 | 3/2017 | Rolle et al. |
| 2017/0100837 | A1 | 4/2017 | Zevenbergen et al. |
| 2017/0178506 | A1 | 6/2017 | Witte et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2018/0020896 | A1 | 1/2018 | High et al. |
| 2018/0181884 | A1* | 6/2018 | Rolle ..................... G06N 20/00 |
| 2018/0349834 | A1 | 12/2018 | Heinla et al. |

OTHER PUBLICATIONS

Jeniece Pettitt: "Forget-delivery-drones-meet-your-new-delivery-robot" Nov. 2, 2015 Retrieved from the Internet: URL: https://www.cnbc.com/2015/1102/forget-delivery-drones-meet-your-new-delivery-robot.html (4 pgs).

Stefan Jacobs, "Lieferroboter Starship: "Klauen würde ich ihn nicht"—Auto—Tagesspiegel" Nov. 29, 2015 Retrieved from the Internet: URL: http://www.tagesspiegel.de/mobil/lieferroboter-starship-klauen-wuerde-ich-ihn-nicht/12647114.html, English translation attached (4 pgs).

WIPO (EPO), Written Opinion of the International Search Authority, for PCT/EP2019/070808, dated Feb. 27, 2020 (11 pgs.).

WIPO (EPO), International Search Report, for PCT/EP2019/070808, dated Feb. 27, 2020 (6 pgs).

* cited by examiner

METHOD AND SYSTEM FOR TRAFFIC LIGHT SIGNAL DETECTION AND USAGE

RELATED APPLICATIONS

This application is the National Stage (a 371) of International Application No. PCT/EP2019/070808, filed Aug. 1, 2019, the entire contents of which are hereby fully incorporated herein by reference for all purposes. PCT/EP2019/070808 claims the priority benefit of European patent application EP 18190327.9, filed Aug. 22, 2018, the entire contents of which are hereby fully incorporated herein by reference for all purposes.

The invention relates to an autonomous or semiautonomous robot. The invention also relates to a method and system for traffic light detection and usage.

Autonomous and semi-autonomous robots travelling on sidewalks and other pedestrian walkways are on the rise. Such robots may need to cross public roads to get to their destination. To do so safely and efficiently, such robots may need to comprise sensors configured to sense the robot's surroundings and generate a picture of the world for the robot. More particularly, WO 2017/064202 A1 discloses a method and a system for delivering a delivery to a delivery recipient by using a robot traveling partially autonomously. While the method and system may be satisfactory in some regards, they still have certain drawbacks and limitations. Generally, there is a need to optimize systems and methods relating to robots travelling partly autonomously as regards the following aspects: It is desirable that the part of the robot travelling autonomously is as large is possible, i.e., it is a desire that the robot requires as little human control as possible. Further, there is a paramount desire to have such robots travelling as safely as possible. Further still, it is desirable to reduce the time necessary for the robot to travel from a first location to a second location, e.g., to reduce energy consumption and traffic.

It is an object of the present invention to overcome or at least alleviate the shortcomings and disadvantages of the prior art. In particular, it is an object of the present invention to enable robots, or, more generally, (partly) autonomously operating vehicles to be improved as regards travelling time (and thus, reduction of traffic and energy consumption), percentage of autonomous operation, and/or safety. These objects are met by the present invention.

According to a first aspect, the present invention relates to a method comprising a data processing device predicting a time for a future state change of a first traffic light.

That is, in the first aspect of the present invention, a data processing device predicts a time for a future state change of a first traffic light before the state change actually happens. That is, the data processing device may "know" the time of the future state change before this state change actually occurs. This may be advantageous, as it may thus be possible to prepare for the future state change, i.e., to trigger actions that are beneficial to have been completed before the state change actually happens. Such a preparation for a future state change may render, e.g., the operation of a mobile robot (which may comprise the data processing device) particularly safe and efficient.

The method may comprise: capturing a plurality of images of the first traffic light; and the data processing device determining occurring states of the first traffic light based on the plurality of images of the first traffic light and the data processing device determining a time of an occurring state change of the first traffic light based on the determined occurred states of the first traffic light; wherein the time of the occurring state change of the first traffic light is taken into account for predicting the time for the future state change of the first traffic light.

That is, in embodiments of the present invention, a differentiation is made between future state changes and occurring state changes. A future state change of a traffic light is a state change that did not yet happen, while an occurring state change is one that occurs (or already has occurred).

Embodiments of the present technology thus utilize occurring state changes to predict future state changes. To do that, images of the first traffic light may be captured, and a state change (e.g., from green to red) may be determined on these images. That is, a data processing device may analyze these images and determine an occurring state change. For example, the data processing device may analyze the images and arrive at the finding that a state change from green to red occurred at a time of 12:13:21. Thus, a time for an occurring state change may be determined by the data processing device.

This time of the occurring state change may then be used to predicting the time of the future state change.

That is, the first traffic light may be observed and it may be determined when a state change has occurred. Based on this state change, the data processing device may then predict the time for a future state change. For example, the data processing device may have access to data relating to rules of the state change. In a very simple example, such a rule could be "the traffic light turns from red to green 60 seconds after turning from green to red". However, it will be understood that the rules may also be more sophisticated, and, e.g., include other parameters (such as a day of the week and a time of the day, as the rules may also be time dependent). In any case, a future state change of the first traffic light may be determined by capturing images of the first traffic light and by determining occurring an occurring state change of the first traffic light in these images.

The method may comprise capturing a plurality of images of a second traffic light; and the data processing device determining occurring states of the second traffic light based on the plurality of images of the second traffic light and the data processing device determining a time of an occurring state change of the second traffic light based on the determined occurred states of the second traffic light; wherein the time of the occurring state change of the second traffic light is taken into account for predicting the time for the future state change of the first traffic light.

That is, not only the occurring state changes of the first traffic light may be taken into account for predicting the time for the future state change of the first traffic light, but also occurring state changes of other traffic lights.

The first traffic light may be located on a first crossing.

The second traffic light may be located on the first crossing.

Alternatively, the second traffic light may not be located on the first crossing.

That is, the second traffic light may be located on the crossing where the first traffic light is located or may be located at a different crossing. For example, in cases where the second traffic light is located on the same crossing where the first traffic light is located, the first and second traffic light may be synchronized with a time delay. As a mere example, the first traffic light may be a traffic light at a pedestrian crossing and the second traffic light may be a traffic light of a road perpendicular to the pedestrian crossing. That is, when the first traffic light is green (and thus gives way to the pedestrians), the second traffic light is red and prohibits vehicles from driving, and vice versa. In such instances, there may typically be a time delay between the traffic lights to ensure that the intersection is empty before giving way to the other traffic participants. As a mere example, the second traffic light (governing the vehicles) may turn red and 10 s afterwards, the first traffic light may turn green. Again, the data processing device may have access to data comprising information relating to such a rule, may capture images of the second traffic light and may, when the second traffic light turns red, predict that the first traffic light will turn green 10 s afterwards.

Furthermore, also in instances where the second traffic light is not located on the first crossing, the first traffic light and the second traffic light may be synchronized. In some instances, traffic lights on subsequent crossings are phased with respect to one another, such that, e.g., a traffic light on an initial crossing is green between the time of 0 s and the time of 20 s, and a further traffic light on a subsequent crossing is green between the time of 15 s and the time of 35 s, i.e., the traffic light on the subsequent crossing changes its state always 15 s after the state change of the traffic light on the initial crossing. Again, the data processing device may have access to data indicating such rules and may thus predict a time for a future state change based on an occurring state change.

The method may comprise: capturing a plurality of images of a third traffic light; and the data processing device determining occurring states of the third traffic light based on the plurality of images of the third traffic light and the data processing device determining a time of an occurring state change of the third traffic light based on the determined occurred states of the third traffic light; wherein the time of the occurring state change of the third traffic light is taken into account for predicting the time for the future state change of the first traffic light.

The third traffic light may be located on the first crossing.

Alternatively, the third traffic light may not be located on the first crossing.

The method may comprise a first mobile robot driving, wherein the first mobile robot comprises a first camera system.

The plurality of images of the first traffic light may be captured by the first camera system.

The plurality of images of the second traffic light may be captured by the first camera system.

The plurality of images of the third traffic light may be captured by the first camera system.

The method may comprise a second mobile robot driving, wherein the second mobile robot comprises a second camera system.

The plurality of images of the second traffic light may be captured by the second camera system.

That is, in embodiments of the present technology, it may be possible that a second robot captures the images of the second traffic light, and that these images are then used to predict a time for a state change of the first traffic light, which may be relevant for the first robot.

Consider, e.g., the situation that the first and the second traffic light are not located on the same intersection, but at different intersections, which may be separated by a separation distance, e.g., exceeding 30 m. In such a scenario, the first robot may observe the first traffic light, but may be unable to observe the second traffic light. However, the first and second traffic lights may still be synchronized with one another. In such a scenario, it may be possible that the second robot observes the second traffic light and generates a notification once a state change of this traffic light has occurred. Thus, a time for a future state change of the first traffic light (relevant for the first robot) may be predicted.

The plurality of images of the third traffic light may be captured by the second camera system.

The first mobile robot may comprise at least a part of the data processing device.

An external server may comprise at least part of the data processing device.

The future state change of the first traffic light may be a state change of the traffic light from a state prohibiting the first mobile robot to cross a road to a state allowing the first mobile robot to cross the road.

The method may further comprise notifying an operator terminal of the future state change before the predicted time of the future state change.

The operator terminal may be notified 1 s to 20 s before the predicted time, preferably 1 s to 10 s before the predicted time, such as 1 s to 5 s before the predicted time.

The first mobile robot may be controlled by the operator terminal after the notification.

That is, in some embodiments, the predicted time for a future state change may be used to hand over operation of the robot to a human operator. It will be understood that partly autonomous travelling robots may travel autonomously most of the time, and only be controlled by a human operator in certain instances. These instances may be difficult or hazardous situation. When considering a robot operating at a sidewalk, it will be understood that the instances when the robot has to cross a road may generally be more hazardous than the mere driving on a sidewalk. Thus, it may advantageous to have a human operator controlling the robot while the robot crosses the road. However, it will further be understood that it is generally be desirable to reduce the percentage of time the robot is controlled by a human operator. Thus, one human operator may be responsible for more robot than would be the case when having a high percentage of the time where the human operator controls an individual robot.

The present technology may be used to facilitate that. More particularly, the robot may travel to a traffic light at a road the robot intends to cross. When the robot arrives, the traffic light may be red, for example. That is, the robot may not be allowed to cross the respective road and may wait at the road crossing. During this time, the robot may be stationary, which may render this situation relatively safe. Thus, during the waiting time, it may be superfluous that a human operator controls the robot.

However, once the traffic light turns green and the robot crosses the road, it may be desirable that the robot be controlled by a human operator. Thus, it may be advantageous that the human operator, and more particularly, the terminal used by the human operator, is notified when the traffic light turns green. However, it may even be more advantageous that the operator terminal is notified shortly before the state change actually occurs. Thus, the human operator may assume control of the robot shortly before the traffic light turns green. This may give the human operator the possibility to establish a full understanding of the situation the robot is presently in shortly before the traffic light turns green. Thus, once the traffic light turns green, the operator may promptly trigger the robot to cross the street. Thus, the presently discussed embodiment allows for a very efficient and safe operation of the robot.

A route of the first mobile robot may be altered in response to the predicted time for a future state change.

The method may comprise determining a first pattern of time delays between occurring state changes of the first traffic light based on the plurality of images of the first traffic light; wherein the first pattern is taken into account for predicting the time for the future state change of the first traffic light.

The first pattern may be time dependent.

In other words, the first pattern may be different for different times of the day and/or for different days of the week.

The method may comprise determining a second pattern of time delays between an occurring state change of the first traffic light and an occurring state change of the second traffic light; wherein the second pattern is taken into account for predicting the time for the future state change of the first traffic light.

The second pattern may be time dependent.

In other words, the second pattern may be different for different times of the day and/or for different days of the week.

The step of determining the second pattern may be based on synchronized images of the first traffic light and the second traffic light.

The method may comprise determining a third pattern of time delays between an occurring state change of the first traffic light and an occurring state change of the third traffic light; wherein the third pattern is taken into account for predicting the time for the future state change of the first traffic light.

The third pattern may be time dependent.

In other words, the third pattern may be different for different times of the day and/or for different days of the week The step of determining the third pattern may be based on synchronized images of the first traffic light and the third traffic light.

The method may further comprise the data processing device determining a state of an additional traffic light based on the determined occurring states of the first traffic light.

The additional traffic light may be a traffic light allowing traffic participants to turn into the road.

That is, from the state of traffic lights (e.g., from the determined states of the first traffic light), embodiments of the present technology can predict when cars can turn into the road to be crossed by the robot. For example, it may be possible that the traffic lights (for pedestrians and the robot to cross a pedestrian crossing on the one hand, and cars to turn into the road the robot intends to cross) are synchronized, but that the cars can only turn into the road for a limited amount of time. E.g., in some crossings, it may be possible that cars can make a left turn only in the beginning or only in the end. That is, the Our full green cycle for a pedestrian crossing does not mean that it will be all the time the same for all the different cars. That is, in embodiments of the present technology, it might be possible to predict that in that particular crossing from the moment it gets green: cars can come from left only at first 30 s (or that they not can come from left on first 30 s, depending on the cycles of the traffic light). That is, embodiments of the present invention may utilize the occurring states of the first traffic light (e.g., the traffic light governing the way of right for the robot) to determine the state of other traffic lights.

In some instances, the pedestrian green has different cycles, e.g., one green cycle of the pedestrian cycle might last for 2 minutes but another one for 6 minutes. Then using other traffic lights would be helpful. That is, in such embodiments it may also be possible that the robot observes the additional traffic light to determine its state. However, it may also be possible that the robot determines the state of the other traffic light by using the occurring states of the first traffic light for differing cycles of the first traffic light.

The method may further comprise the data processing device assigning the first traffic light to a mapped traffic light.

The method may further comprise the data processing device assigning the second traffic light to a mapped traffic light.

The method may further comprise the data processing device assigning the third traffic light to a mapped traffic light.

That is, in embodiments of the present invention, there may be captures images of the first, second, and/or third traffic light. E.g., to predict the future state changes, the captured images have to be assigned to mapped traffic lights, for which the cycles are known. Thus, in embodiments of the present invention, after capturing the images of the traffic light, this traffic light is assigned to a mapped traffic light, i.e., it is determined to which mapped traffic light (which operates with certain rules) a captured traffic light and its occurring state changes belong.

Generally, it will be understood that the first aspect of the present invention relates to a method (and a corresponding system) for detection and use the states of traffic lights. This aspect can be used to traverse roads, more particularly for a mobile robot to safely traverse car roads.

A further aspect of the present invention may also relate to a method comprising a data processing device generating a map of traffic lights, wherein the map of traffic lights comprises a location of at least one localization traffic light.

It should be understood that the term "localization traffic light" is used to denote a traffic light that is localized on the map. In other words, the term "localization traffic light" is used to denote that a traffic light is used in the map creating method. That is, any traffic light whose location is on the map (or is intended to be put on the map) may be referred to as a "localization traffic light".

Generally, it should be understood that some embodiments relating to generating a map of traffic lights start with an initial or "raw" map not including the traffic lights (but other features, such as roads) and supplement such an initial or "raw" map with the location of the traffic lights. That is, in such embodiments, e.g., the robot may have access to such an initial or "raw" map, may localize itself on the map and may thus supplement the map (e.g., based on captured images) with locations of the traffic lights.

The method may comprise capturing a plurality of images of the at least one localization traffic light; determining a capture location where at least one image from the plurality of images of the at least one localization traffic light is captured; and determining the location of the at least one localization traffic light based on the capture location of the at least one image of the at least one localization traffic light.

It should be understood that the capture location denotes the location where the respective image has been captured. In embodiments of the present invention, the images are captured by a camera system comprised in the mobile robot. Thus, a location of the mobile robot while capturing the image is the capture location. To determine the capture location and thus determine the location of the at least one localization traffic light, it is advantageous that the robot has access to a precise map and may localize itself utilizing such a map. For example, the robot may localize itself using the technology described in WO 2017/076929 A1, incorporated herein by reference in its entirety. Thus, the capture location may be determined.

The step of capturing a plurality of images of the at least one localization traffic light may comprise capturing a plurality of images; and the data processing device determining the presence of at least one localization traffic light on each of the plurality of captured images.

The step of determining the presence of at least one localization traffic light on each of the plurality of captured images may comprise utilizing a machine learning algorithm, such as a neural network algorithm.

The machine learning algorithm may be trained using a plurality of images of traffic lights.

The step of capturing a plurality of images of the at least one localization traffic light may comprise capturing a plurality of images of at least one road crossing.

The method may comprise the data processing device determining the location of the at least one localization traffic light on at least one image; wherein the location of at least one localization traffic light on at least one image is taken into account for determining the location of the at least one localization traffic light.

The map of traffic lights may be generated by adding the location of at least one localization traffic light to an initial map.

The map of traffic lights may comprise information related to the location of roads and/or buildings, such as, information regarding the relative position of roads and/or buildings to the location of at least one localization traffic light.

The method may comprise adding to the map of traffic lights a respective pattern of time delays between occurring state changes of the at least one localization traffic light.

The pattern of time delays between occurring state changes of the at least one localization traffic light may be added manually by a human operator.

The step of adding to the map of traffic lights a respective pattern of time delays between occurring state changes of a localization traffic light may comprise: capturing a plurality of images of the localization traffic light; the data processing device determining occurring states of the localization traffic light based on the plurality of images of the localization traffic light; and the data processing device determining a time of an occurring state change of the localization traffic light based on the determined occurred states of the localization traffic light; wherein the time of an occurring state change of the localization traffic light is taken into account for determining the pattern of time delays between occurring state changes of the localization traffic light.

The step of the data processing device determining occurring states of the localization traffic light based on the plurality of images of the localization traffic light may comprise at least one of utilizing a brightness thresholding image processing algorithm and utilizing a color identification image processing algorithm.

The method may comprise determining patterns of time delays between occurring state changes of two or more localization traffic lights based on the respective pattern of time delays between occurring state changes of the two or more localization traffic lights; and adding to the map of traffic lights the patterns of time delays between occurring state changes of two or more localization traffic lights.

The method may comprise a mobile robot driving, wherein the mobile robot comprises a camera system.

The plurality of images may be captured by the camera system of the mobile robot. The mobile robots may comprise at least a part of the data processing device. An external server may comprise at least part of the data processing device.

The method may further comprise annotating the at least one localization traffic light according to a type of road crossing.

Furthermore, the above discussed method relating to predicting a future state change of a traffic light and the map creation can also be combined. That is, a further aspect of the present invention relates to a method of generating and utilizing a map of traffic lights, wherein the method comprises the method relating to the map creation as discussed above and the method relating to predicting a future state change as discussed above.

The at least one localization traffic light may comprise the first traffic light of the predicting method.

The method may comprise adding to the map of traffic lights the location of the first traffic light.

That is, the combined method may comprise to first generate a map comprising the location of the first traffic light and then utilizing this map to predict a future state change of this first traffic light.

The at least one localization traffic light may comprise the second traffic light of the predicting method.

The method may comprise adding to the map of traffic lights the location of the second traffic light.

The at least one localization traffic light may comprise the third traffic light of the predicting method.

The method may comprise adding to the map of traffic lights the location of the third traffic light.

That is, the combined method may also comprise to generate a map comprising the location of the second and/or third traffic light and then to utilize this map to predict a future state change of the first traffic light.

The method may comprise adding the first pattern to the map.

The method may comprise adding the second pattern to the map.

The method may comprise adding the third pattern to the map.

That is, in the combined method, any of the above discussed patterns (the first pattern relating to time delays in state changes of the first traffic light, the second pattern relating to time delays of state changes of the second traffic light with respect to the first traffic light, and the third pattern relating to time delays in state changes of the third traffic light with respect to the first traffic light) may also be added to the map and may then subsequently be used to determine a future state change of the first traffic light.

In this method, data comprised in the map of traffic lights may be used to predict a time for a future state change of the first traffic light.

In a still further aspect, the present invention also relates to a system configured to perform at least one of the methods discussed above.

The system may comprise the data processing device.

The data processing device may be configured to process at least one image of a traffic light for detecting at least one occurring state of the traffic light.

The data processing device may be configured to process at least two images of a traffic light for detecting an occurring state change of the traffic light.

The data processing device may be configured to detect a first occurring state of the traffic light on a first image from the at least two images of the traffic light; detect a second occurring state of the traffic light on a second image from the at least two images of the traffic light; determine an occurring state change based on the detected first and second occurring states; and determine a time of the occurring state change based on capturing times of the at least two images.

The data processing device may be configured to process at least one image for detecting at least one localization traffic light on the at least one image.

The data processing device may be configured to execute a machine learning algorithm for detecting at least one localization traffic light on the at least one image.

The data processing device may be configured to determine a capturing location of at least one image comprising a localization traffic light; and determine a location of a localization traffic light based on the location of the at least one image comprising a localization traffic light.

The system may comprise a mobile robot comprising a camera system.

The at least one image may be captured by the camera system.

The at least two images may be captured by the camera system.

The mobile robot may comprise a part of the data processing device.

The system may comprise an external server and the external server may comprise part of the data processing device.

The system may comprise an operator terminal.

The data processing device may be configured to notify the operator terminal of the future state change before the predicted time of the future state change, such as, 1 s to 20 s before the predicted time, preferably 1 s to 10 s before the predicted time, such as 1 s to 5 s before the predicted time.

The operator terminal may be configured to control the mobile robot after the notification.

The system may comprise the first mobile robot.

The system may comprise the second mobile robot.

That is, the present invention may relate to building (as in the map creation realization) and/or using a map of traffic lights using existing high resolution footage. The high resolution images may be generated, e.g., from "incident reports" that happen near intersections. Such high resolution images may be automatically collected in order to get high resolution images towards the same intersection from different locations to facilitate the mapping of traffic lights.

As discussed before, in embodiments of the present invention, the robot is switched from autonomous mode to operator control right before the traffic light turns green for the robot, which may require the prediction of a future state change of the traffic light.

The present invention is also defined by the following numbered embodiments.

Below, predicting method embodiments will be discussed. These embodiments are abbreviated by the letter "M" followed by a number. Whenever reference is herein made to predicting method embodiments, these embodiments are meant. The respective method will also be referred to as a predicting method.

M1. A method comprising
a data processing device predicting a time for a future state change of a first traffic light.

M2. The method according to the preceding embodiment, wherein the method comprises
capturing a plurality of images of the first traffic light;
the data processing device determining occurring states of the first traffic light based on the plurality of images of the first traffic light and the data processing device determining a time of an occurring state change of the first traffic light based on the determined occurred states of the first traffic light;
wherein the time of the occurring state change of the first traffic light is taken into account for predicting the time for the future state change of the first traffic light.

That is, in embodiments of the present invention, a differentiation is made between future state changes and occurring state changes. A future state change of a traffic light is a state change that did not yet happen, while an occurring state change is one that occurs (or already has occurred).

Embodiments of the present technology thus utilize occurring state changes to predict future state changes. To do that, images of the first traffic light may be captured, and a state change (e.g., from green to red) may be determined on these images. That is, a data processing device may analyze these images and determine an occurring state change. For example, the data processing device may analyze the images and arrive at the finding that a state change from green to red occurred at a time of 12:13:21. Thus, a time for an occurring state change may be determined by the data processing device.

This time of the occurring state change may then be used to predicting the time of the future state change.

M3. The method according to any of the preceding embodiments, wherein the method comprises
capturing a plurality of images of a second traffic light;
the data processing device determining occurring states of the second traffic light based on the plurality of images of the second traffic light and the data processing device determining a time of an occurring state change of the second traffic light based on the determined occurred states of the second traffic light;
wherein the time of the occurring state change of the second traffic light is taken into account for predicting the time for the future state change of the first traffic light.

M4. The method according to any of the preceding embodiments, wherein the first traffic light is located on a first crossing.

M5. The method according to the preceding embodiment and with the features of embodiment M3, wherein the second traffic light is located on the first crossing.

M6. The method according to the penultimate embodiment and with the features of embodiment M3, wherein the second traffic light is not located on the first crossing.

M7. The method according to any of the preceding embodiments with the features of embodiment M3, wherein the method comprises
capturing a plurality of images of a third traffic light;
the data processing device determining occurring states of the third traffic light based on the plurality of images of the third traffic light and the data processing device determining a time of an occurring state change of the third traffic light based on the determined occurred states of the third traffic light;
wherein the time of the occurring state change of the third traffic light is taken into account for predicting the time for the future state change of the first traffic light.

M8. The method according to the preceding embodiment and with the features of embodiment M4, wherein the third traffic light is located on the first crossing.

M9. The method according to the penultimate embodiment and with the features of embodiment M4, wherein the third traffic light is not located on the first crossing.

M10. The method according to any of the preceding embodiments, wherein the method comprises
a first mobile robot driving, wherein the first mobile robot comprises a first camera system.

M11. The method according to the preceding embodiment and with the features of embodiment M2, wherein the plurality of images of the first traffic light are captured by the first camera system.

M12. The method according to any of the preceding embodiments with the features of embodiments M3 and M10, wherein the plurality of images of the second traffic light are captured by the first camera system.

M13. The method according to any of the preceding embodiments with the features of embodiments M7 and M10, wherein the plurality of images of the third traffic light are captured by the first camera system.

M14. The method according to any of the preceding embodiments with the features of embodiment M10, wherein the method comprises
a second mobile robot driving, wherein the second mobile robot comprises a second camera system.

M15. The method according to the preceding embodiment when not dependent on embodiment M12, wherein the plurality of images of the second traffic light are captured by the second camera system.

M16. The method according to the penultimate embodiment when not dependent on embodiment M13, wherein the plurality of images of the third traffic light are captured by the second camera system.

M17. The method according to any of the preceding embodiments with the features of embodiment M10, wherein the first mobile robot comprises at least a part of the data processing device.

M18. The method according to any of the preceding embodiments, wherein an external server comprises at least part of the data processing device.

M19. The method according to any of the preceding embodiments with the features of embodiment M10, wherein the future state change of the first traffic light is a state change of the traffic light from a state prohibiting the first mobile robot to cross a road to a state allowing the first mobile robot to cross the road.

M20. The method according to the preceding embodiment, wherein the method further comprises notifying an operator terminal of the future state change before the predicted time of the future state change.

M21. The method according to the preceding embodiment, wherein the operator terminal is notified 1 s to 20 s before the predicted time, preferably 1 s to 10 s before the predicted time, such as 1 s to 5 s before the predicted time.

M22. The method according to any of the 2 preceding embodiments, wherein the first mobile robot is controlled by the operator terminal after the notification.

M23. The method according to any of the preceding embodiments with the features of embodiment M10, wherein a route of the first mobile robot is altered in response to the predicted time for a future state change.

M24. The method according to any of the preceding embodiments with the features of embodiment M2, wherein the method comprises
determining a first pattern of time delays between occurring state changes of the first traffic light based on the plurality of images of the first traffic light;
wherein the first pattern is taken into account for predicting the time for the future state change of the first traffic light.

M25. The method according to the preceding embodiment, wherein the first pattern is time dependent.

In other words, the first pattern may be different for different times of the day and/or for different days of the week.

M26. The method according to any of the preceding embodiments with the features of embodiments M3, wherein the method comprises
determining a second pattern of time delays between an occurring state change of the first traffic light and an occurring state change of the second traffic light;
wherein the second pattern is taken into account for predicting the time for the future state change of the first traffic light.

M27. The method according to the preceding embodiment, wherein the second pattern is time dependent.

In other words, the second pattern may be different for different times of the day and/or for different days of the week.

M28. The method according to any of the 2 preceding embodiments, wherein the step of determining the second pattern is based on synchronized images of the first traffic light and the second traffic light.

M29. The method according to any of the preceding embodiments with the features of embodiments M7, wherein the method comprises
determining a third pattern of time delays between an occurring state change of the first traffic light and an occurring state change of the third traffic light;
wherein the third pattern is taken into account for predicting the time for the future state change of the first traffic light.

M30. The method according to the preceding embodiment, wherein the third pattern is time dependent.

In other words, the third pattern may be different for different times of the day and/or for different days of the week M31. The method according to any of the 2 preceding embodiments, wherein the step of determining the third pattern is based on synchronized images of the first traffic light and the third traffic light.

M32. The method according to any of the preceding embodiments with the features of embodiment M2, wherein the method further comprises
the data processing device determining a state of an additional traffic light based on the determined occurring states of the first traffic light.

M33. The method according to the preceding embodiment and with the features of embodiment M19, wherein the additional traffic light is a traffic light allowing traffic participants to turn into the road.

M34. The method according to any of the preceding embodiments with the features of embodiment M2, wherein the method further comprises
the data processing device assigning the first traffic light to a mapped traffic light.

M35. The method according to any of the preceding embodiments with the features of embodiment M3, wherein the method further comprises the data processing device assigning the second traffic light to a mapped traffic light.

M36. The method according to any of the preceding embodiments with the features of embodiment M7, wherein the method further comprises
the data processing device assigning the third traffic light to a mapped traffic light.

Below, map creation method embodiments will be discussed. These embodiments are abbreviated by the letter "A" followed by a number. Whenever reference is herein made to map creation method embodiments, these embodiments are meant. The respective method will also be referred to as a map creation method.

A1. A method comprising
  a data processing device generating a map of traffic lights, wherein the map of traffic lights comprises a location of at least one localization traffic light.
  It should be understood that the term "localization traffic light" is used to denote a traffic light that is localized on the map. In other words, the term "localization traffic light" is used to denote that a traffic light is used in the map creating method. That is, any traffic light whose location is on the map (or is intended to be put on the map) may be referred to as a "localization traffic light".

A2. The method according to the preceding embodiment, wherein the method comprises
  capturing a plurality of images of the at least one localization traffic light;
  determining a capture location where at least one image from the plurality of images of the at least one localization traffic light is captured;
  determining the location of the at least one localization traffic light based on the capture location of the at least one image of the at least one localization traffic light.

A3. The method according to the preceding embodiment, wherein the step of capturing a plurality of images of the at least one localization traffic light comprises capturing a plurality of images;
  the data processing device determining the presence of at least one localization traffic light on each of the plurality of captured images.

A4. The method according to the preceding embodiment, wherein the step of determining the presence of at least one localization traffic light on each of the plurality of captured images comprises utilizing a machine learning algorithm, such as a neural network algorithm.

A5. The method according to the preceding embodiment, wherein the machine learning algorithm is trained using a plurality of images of traffic lights.

A6. The method according to the any of the 4 preceding embodiments, wherein the step of capturing a plurality of images of the at least one localization traffic light comprises capturing a plurality of images of at least one road crossing.

A7. The method according to any of the preceding 5 embodiments, wherein the method comprises
  the data processing device determining the location of the at least one localization traffic light on at least one image;
  wherein the location of at least one localization traffic light on at least one image is taken into account for determining the location of the at least one localization traffic light.

A8. The method according to any of the preceding map creation method embodiments, wherein the map of traffic lights is generated by adding the location of at least one localization traffic light to an initial map.

A9. The method according to any of the preceding map creation method embodiments, wherein the map of traffic lights comprises information related to the location of roads and/or buildings, such as, information regarding the relative position of roads and/or buildings to the location of at least one localization traffic light.

A10. The method according to any of the preceding map creation method embodiments, wherein the method comprises adding to the map of traffic lights a respective pattern of time delays between occurring state changes of the at least one localization traffic light.

A11. The method according to the preceding embodiment, wherein the pattern of time delays between occurring state changes of the at least one localization traffic light is added manually by a human operator.

A12. The method according to the penultimate embodiment, wherein the step of adding to the map of traffic lights a respective pattern of time delays between occurring state changes of a localization traffic light comprises
  capturing a plurality of images of the localization traffic light;
  the data processing device determining occurring states of the localization traffic light based on the plurality of images of the localization traffic light;
  the data processing device determining a time of an occurring state change of the localization traffic light based on the determined occurred states of the localization traffic light;
  wherein the time of an occurring state change of the localization traffic light is taken into account for determining the pattern of time delays between occurring state changes of the localization traffic light.

A13. The method according to the preceding embodiment, wherein the step of the data processing device determining occurring states of the localization traffic light based on the plurality of images of the localization traffic light comprises at least one of
  utilizing a brightness thresholding image processing algorithm;
  utilizing a color identification image processing algorithm.

A14. The method according to any of the preceding map creation method embodiments and with the features of embodiment A10, wherein the method comprises
  determining patterns of time delays between occurring state changes of two or more localization traffic lights based on the respective pattern of time delays between occurring state changes of the two or more localization traffic lights;
  adding to the map of traffic lights the patterns of time delays between occurring state changes of two or more localization traffic lights.

A15. The method according to any of the preceding map creation method embodiments, wherein the method comprises a mobile robot driving, wherein the mobile robot comprises a camera system.

A16. The method according to the preceding embodiment and with the features of embodiment A2, wherein the plurality of images is captured by the camera system of the mobile robot.

A17. The method according to the preceding map creation embodiment, wherein the mobile robots comprises at least a part of the data processing device.

A18. The method according to any of the preceding map creation embodiments, wherein an external server comprises at least part of the data processing device.

A19. The method according to any of the preceding map creation embodiments, wherein the method further comprises annotating the at least one localization traffic light according to a type of road crossing.

Below, embodiments relating to a method of generating and utilizing a map of traffic lights will be discussed. These embodiments will also be referred to as generate and use embodiments and will be abbreviated by the letter B followed by a number. Whenever reference is herein made to generate and use embodiments (or GU embodiments), these embodiments are meant. The method will also be referred to as a GU method.

B1. A method of generating and utilizing a map of traffic lights, wherein the method comprises the method according to any of the preceding map creation method embodiments and the method according to any of the preceding predicting method embodiments.

B2. The method according to the preceding embodiment, wherein the at least one localization traffic light comprises the first traffic light of the predicting method.

B3. The method according to the preceding embodiment, wherein the method comprises adding to the map of traffic lights the location of the first traffic light.

B4. The method according to any of the preceding GU embodiments, wherein the predicting method comprises the features of embodiment M3, wherein the at least one localization traffic light comprises the second traffic light of the predicting method.

B5. The method according to the preceding embodiment, wherein the method comprises adding to the map of traffic lights the location of the second traffic light.

B6. The method according to any of the preceding GU embodiments, wherein the predicting method comprises the features of embodiment M7, wherein the at least one localization traffic light comprises the third traffic light of the predicting method.

B7. The method according to the preceding embodiment, wherein the method comprises adding to the map of traffic lights the location of the third traffic light.

B8. The method according to any of the preceding GU embodiments, wherein the predicting method comprises the features of embodiment M24, the GU method comprising adding the first pattern to the map.

B9. The method according to any of the preceding GU embodiments, wherein the predicting method comprises the features of embodiment M26, wherein the GU method comprises adding the second pattern to the map.

B10. The method according to any of the preceding GU embodiments, wherein the predicting method comprises the features of embodiment M28, wherein the GU method comprises adding the third pattern to the map.

B11. The method according to any of the preceding GU embodiments, wherein data comprised in the map of traffic lights is used to predict a time for a future state change of the first traffic light.

Below, system embodiments will be discussed. These embodiments are abbreviated by the letter "S" followed by a number. Whenever reference is herein made to system embodiments, these embodiments are meant.

S1. A system configured to perform the method according to any of the preceding predicting method embodiments, map creation embodiments, or GU embodiments.

S2. The system according to the preceding embodiment, wherein the system is configured to perform the method according to any of the preceding predicting method embodiments, wherein the system comprises the data processing device.

S3. The system according to the preceding embodiment, wherein the data processing device is configured to process at least one image of a traffic light for detecting at least one occurring state of the traffic light.

S4. The system according to any of the 2 preceding embodiments, wherein the data processing device is configured to process at least two images of a traffic light for detecting an occurring state change of the traffic light.

S5. The system according to the preceding embodiment, wherein the data processing device is configured to detect a first occurring state of the traffic light on a first image from the at least two images of the traffic light; detect a second occurring state of the traffic light on a second image from the at least two images of the traffic light;
determine an occurring state change based on the detected first and second occurring states;
determine a time of the occurring state change based on capturing times of the at least two images.

S6. The system according to any of the preceding system embodiments, wherein the system is configured to perform the method according to any of the preceding map creation method embodiments, wherein the data processing device is configured to process at least one image for detecting at least one localization traffic light on the at least one image.

S7. The system according to the preceding embodiment, wherein the data processing device is configured to execute a machine learning algorithm for detecting at least one localization traffic light on the at least one image.

S8. The system according to any of the 2 preceding embodiments, wherein the data processing device is configured to determine a capturing location of at least one image comprising a localization traffic light;
determine a location of a localization traffic light based on the location of the at least one image comprising a localization traffic light.

S9. The system according to any of the preceding system embodiments, wherein the system comprises a mobile robot comprising a camera system.

S10. The system according to the preceding embodiment and with the features of embodiment S3, wherein the at least one image is captured by the camera system.

S11. The system according to any of the 2 preceding embodiments and with the features of embodiment S4, wherein the at least two images are captured by the camera system.

S12. The system according to the preceding embodiment and with the features of embodiment S6, wherein the at least one image is captured by the camera system.

S13. The system according any of the 4 preceding embodiments, wherein the mobile robot comprises a part of the data processing device.

S14. The system according to any of the preceding system embodiments wherein the system comprises an external server and the external server comprises part of the data processing device.

S15. The system according to any of the preceding system embodiments, wherein the system comprises an operator terminal.

S16. The system according to the preceding embodiment and with the features of embodiment S2, wherein the data processing device is configured to notify the operator terminal of the future state change before the predicted time of the future state change, such as, 1 s to 20 s before the predicted time, preferably 1 s to 10 s before the predicted time, such as 1 s to 5 s before the predicted time.

S17. The system according to the preceding 2 embodiments, wherein the operator terminal is configured to control the mobile robot after the notification.

S18. The system according to any of the preceding system embodiments and with the features of embodiment M10, wherein the system comprises the first mobile robot.

S19. The system according to the preceding system embodiment and with the features of embodiment M14, wherein the system comprises the second mobile robot.

DETAILED DESCRIPTION OF THE FIGURES

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, time delays between steps can be present between some or all of the described steps.

The description of the figures first provides a general overview of embodiments of the present invention, before providing further details of more specific embodiments, features and steps of the exemplary embodiments of the present invention.

Figure 5A:
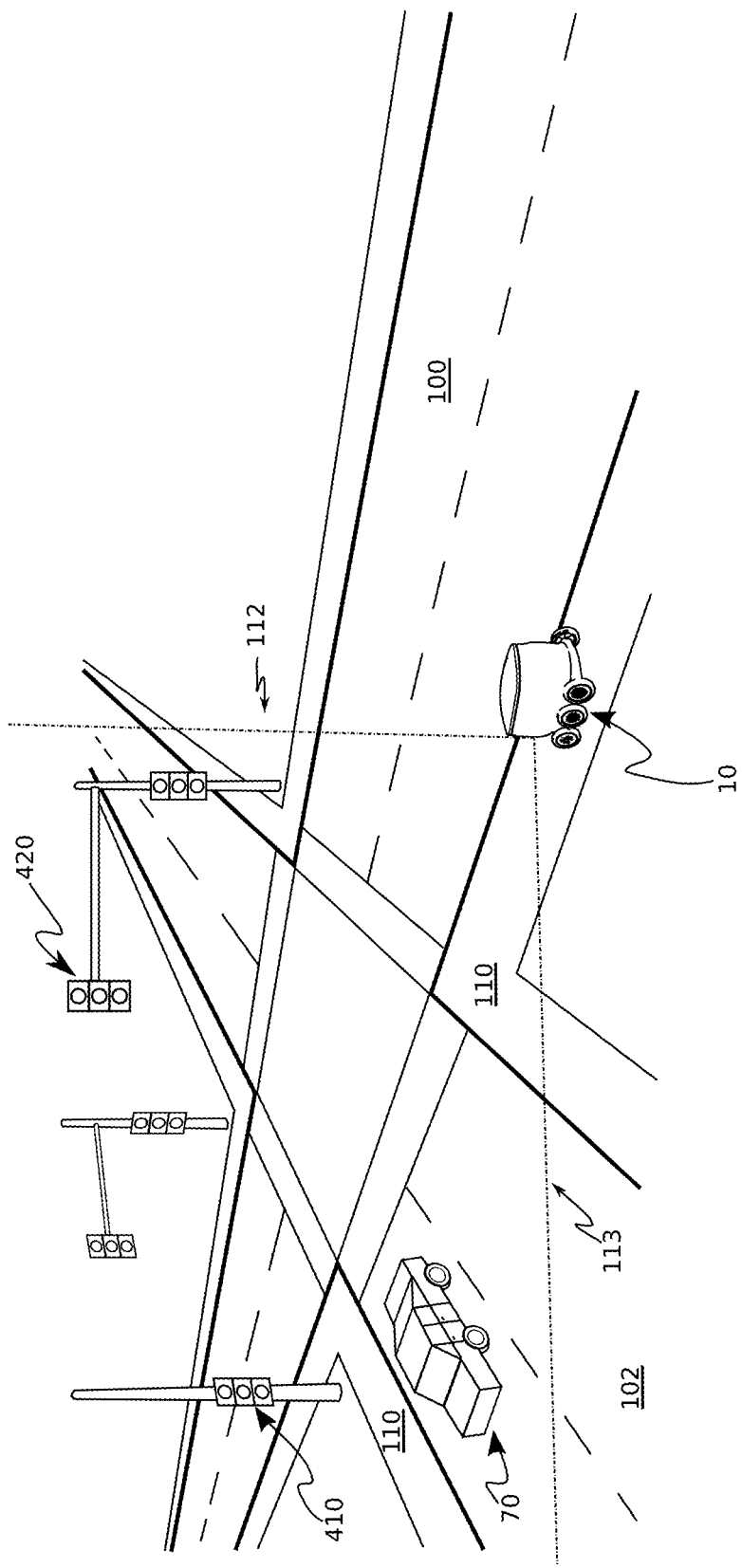
FIG. 5a depicts the mobile robot configured to identify patterns of the traffic light state changes on the environment of FIG. 1.

In general terms, embodiments of the present invention relate to methods and systems relating to a mobile robot 10 travelling on sidewalks 110 (see FIG. 5a). When travelling on sidewalks 110, the mobile robot 10 may sometimes be required to cross roads 100, 102. Such road crossings may be equipped with traffic lights 410, 420, giving permission to the traffic participants when to cross the road.

The robot 10 may travel autonomously (i.e., without a human operator controlling it) or semi-autonomously (i.e., with a human operator controlling it part of its travelling time).

A typical scenario for human operation of the semi-autonomous robot 10 is the road crossing. It will be understood that the robot 10 crossing the road 102 may be more hazardous than the robot 10 just travelling on the sidewalk 110.

Embodiments of the present invention relate to handing over control of the robot 10 to the human operator shortly before the traffic light 410 relevant for the robot 10 crossing the road 102 switches from red to green.

In simple words, embodiments of the present technology relate to creating a map including traffic lights and patterns of their state changes, and utilizing this map with the patterns of traffic light state changes to infer a future state change of a traffic light.

Generally, embodiments of the present invention may comprise the following steps:

Initially, steps relating to creating a map of traffic lights will be described.

In such an embodiments relating to creation of a map of traffic lights, images are collected at the intersections. The images may be high-resolution images. A couple of images per square meter can be collected. The image collection is typically performed by the robots 10. A track record of where such images have been collected may also be created for checking where additional images need to be collected.

On these images, traffic lights and preferably their angle are detected. For this detection, neural networks may be used. In this step, there may also be utilized a similarity score to indicate a similarity between an object on an image and a traffic light (which may correspond to the probability of a traffic light being present on the image). This detection step is typically performed on a data processing device, e.g., on a server. That is, the images can be uploaded to the data processing device and traffic lights can be detected offline on such images.

After the detection, the traffic lights may be mapped. That is, a map may be created including these traffic light. Again, this step may be performed by the data processing device (e.g., the server) and offline. It will be understood that the map is an (e.g., two-dimensional) data set comprising information relating to positions of objects (such as roads, sidewalks), the objects also including the traffic lights. Further, it will be understood when creating the map of traffic lights, it may be possible to start with an initial or "raw" map comprising, e.g., the streets, and supplementing this map with the location of the traffic lights.

In an optional step, the traffic lights may be annotated. The annotation may differentiate the traffic lights for autonomous crossings or operator-based crossings.

In a further step, states of the traffic lights may be recorded. This may be done by the robots 10. Exemplary states may include permitting to cross (usually indicated by a green light), prohibiting a crossing (usually indicated by a red light), and optionally also an intermediate state (usually indicated by an orange light).

The recorded state changes for the traffic lights can also be used to build a model to predict future state changes of traffic lights. That is, the recorded state changes (i.e., information relating to the state of the traffic light at different times) may be provided to the data processing device, and the data processing device may create a prediction model for future state changes. A very simple exemplary prediction model may be that a traffic light turns green 20 seconds after it turns red. Other prediction models may also take into account the state changes of other traffic lights (on the same intersection or on different intersections).

Further embodiments of the present technology relate to predicting future state changes of traffic lights, e.g., by utilizing the map of traffic lights that has been created.

That is, in embodiments of the present technology, the created map, or generally, the model for the state changes of the traffic lights may then be used to predict a future state change of a traffic light, e.g., the traffic light 410 relevant for the robot 10 (see FIG. 5a). Based on the predicted time for the state change, the human operator can be notified just in time before the state change occurs. This may increase the autonomous percentage and the overall efficiency of operating the robot.

Further details of the present technology will be discussed below.

Embodiments of the present invention relate to methods and systems comprising a mobile robot 10 (see FIG. 1) that may travel autonomously (without a human operator controlling it) or semi-autonomously (with a human operator only controlling it at some times during its operation). That is, the mobile robot 10 can be an autonomous or nearly-autonomous robot 10 of any of the 6 (0 to 5) automation levels, preferably levels 1 to 5, as defined by the Society of Automotive Engineers (SAE) in J3016 Autonomy Levels. In some embodiments, the mobile robot 10 can be a fully autonomous mobile robot 10 (i.e. level 5 according to SAE). That is, the fully autonomous mobile robot 10 can navigate, drive and execute other functionalities related to its operation on its own without a human operator controlling it. In some embodiments, the mobile robot 10 can be nearly- or semi-autonomous (e.g. any of levels 1 to 4 according to SAE). That is, the nearly autonomous mobile robot 10 can in some instances and/or for some functionalities operate on its own and in some other instance and/or other functionalities be assisted by a human operator. Such a robot 10 may travel (i.e., drive) in public environments, e.g., on sidewalks.

Some embodiments of the present invention concern building and/or using a map of traffic lights. Said map may comprise information regarding the location and position of the traffic lights, such as the relative position between the traffic lights of an area of operation. Said map may also comprise information regarding the location of roads, such as the relative position of roads with respect to each other. The map may also comprise information regarding the roads and the traffic lights, such as, the relative position of the traffic lights relative to the roads. Said map may also comprise information regarding the pattern on the traffic light state changes, such as the synchronization between the traffic lights. The map may be created based on images captured near at least one intersection. Such images may be captured by one or more mobile robots 10.

In some embodiments, a map can be obtained by the mobile robot 10, such as OpenStreetMap by the OpenStreetMap Foundation, Sutton Coldfield, UK. This map can comprise information about the roads, buildings and other physical features of the environment. Such a map can be used by the mobile robot 10 for localization and/or navigation. Further, the map can facilitate the creation of a map of traffic lights. For example, the mobile robot 10 can use the map for localization and navigation, and take images that can then subsequently used for creating the map of the traffic lights (these aspects may thus relate to the creation of the map of traffic lights). In some embodiments, an initial map (i.e. the map comprising information about roads, buildings and other physical features of the environment) can be extended with information relating to traffic lights.

Further, such a map of traffic lights can then also be used to predict a future state change of traffic lights. In embodiments relating thereto, the mobile robot can take images of traffic lights that can be used for locating traffic lights and/or other features related to the traffic lights (such as the patterns on the traffic lights state changes).

In some embodiments, the mobile robot can have access to a memory device that can comprise images or videos of roads, particularly of places in the roads comprising traffic lights, such as intersections or road crossings (for example zebra crossings). It is common and probable that the intersections (i.e. road intersections) and the road crossings are equipped with traffic lights. Thus, images or videos at an intersection or at road crossings are advantageous in the present invention.

Further, it is advantageous that more than one image is taken at an intersection and such images are taken in consecutive steps of time, such as, for example every 5 ms, 10 ms, 100 ms, or 1 s. For example, the images can be part of a video (each frame of the video can be an image). In another example, the images are taken by at least one camera configured in burst mode (also referred continues shooting mode), wherein more than one image are captured successively one after another. The speed at which successive images are captured can depend on the camera or can be a programmable parameter. In yet another example, the images are taken by at least one camera that records a video at an intersection. Thus, the images are realized as video frames. The videos can comprise different frame rates (i.e. number of still images per unit of time), such as 1, 6, 8, 24, 60, 120 or more frames per second.

To put it simply, it can be advantageous that multiple successive images are taken for a particular scene wherein a time delay between the images is present. A small time delay, meaning a high frame rate, can allow for a better and more accurate detection of the movements in the images. For example, if the frame rate is 1 frame per minute and the movement of an object captured by the images lasts only 1 second, then it can be hard to infer an accurate time during which the movement happened. With a higher frame rate, such as 60 frames per second, in the above example, a more accurate inference about the timing of the movement can be made. However, higher frame rate means that more images need to be stored on the memory, thus more memory need to be allocated for such a purpose.

In the below, further details are provided of how a map comprising traffic lights can be created.

As stated in the above embodiments, the mobile robot 10 can purposefully (i.e. for the purpose of creating a map of traffic lights and/or for detecting state change patterns of such traffic lights) capture images at an intersection. That is, the mobile robot can localize itself and can deduce that it is located near or at an intersection, such as less than 50 m away from the center of the intersection. Further, the mobile robot can capture images or videos at the intersection and can store such images or videos in a memory. In some embodiments, the mobile robot 10 can use existing databases of images. For example, the mobile robot can have access to a memory comprising images of the environment it is operating. For example, the images may have been stored in the memory for the purpose of using them for visual based localization. In another example, the images may have been stored in the memory by the mobile robot during a hazardous situation, such as during a malfunction of the robot, wherein images or videos were recorded by the mobile robot as part of the incident report. Generally, it can be any reason that the images may have been stored in the memory. Further, such images or the memory comprising such images can be shared by several mobile robots. That is, information based on the images captured by a mobile robot can also be accessed by another mobile robot. For example, the mobile robots 10 may share or have access to the memory device storing information relating to a map of the environment.

In a further step, a data processing device can process the images for detecting traffic lights on the images. This step may be performed by a server, i.e., not locally on the robot. That is, the images that the mobile robot can obtain are captured at an intersection. However, some of the images may not contain a traffic light. Thus, the images may be processed, using a data processing device, to detect if each of them comprises a traffic light as well as the position of the traffic light on the image. Once a traffic light is detected on the image and its position on the image is found, the position, location and/or orientation of the traffic light in the real world, or relative to the mobile robot's position, can be inferred. For example, the position of the traffic light relative to an object in a map can be inferred, such as, relative to the intersection, or to a road in the map. Using such information, a map of traffic lights can be created or a current map can be extended, to thus further comprise information regarding the position of the traffic lights.

The processing of the images for detecting the traffic lights on the images that the mobile robot can obtain, can be facilitated by neural network algorithms. For example, the data processing device can search in the images for patterns or shapes similar to a traffic light. For this purpose, the data processing device can use (or can be trained with) a plurality of photos of traffic lights captured in different angles or light conditions, or different types of traffic lights. In other words, the higher the diversity of traffic light images used for training the data processing device, the better the results on detecting a traffic light on a processed image. By comparing the shapes and the patterns on the image being processed with different images of the traffic lights, the data processing device can assign a probability based on the likelihood that a found pattern represent a traffic light. A threshold level can be defined for deducing if a traffic light is detected on the image or not. Thus, a map of traffic lights can be built, and/or an existing map can be supplemented with information relating to traffic lights.

In the below, further details of determining patterns of state changes of traffic lights will be explained.

A further embodiment of this invention relates to determining a timing between state changes for at least one traffic light in an intersection or more than one intersection and switching the robots from autonomous mode (i.e. without the control of a human operator) to operator control (i.e. with the control or assistance of a human operator and/or an operator terminal and/or an control interface device) right before the traffic light turns green for the robot.

Generally, it will be understood that the mobile robot 10 may travel autonomously, i.e., without a human operator controlling the robot 10. However, sometimes, the robot 10 may require help from a human operator, e.g., in hazardous situations or in situations unknown to the robot 10. In such instances, a communication connection (e.g., via a mobile network) may be established between the robot 10 and an operator terminal, e.g., a terminal (such as a computer) controlled by a human. The human operator may then enter instructions into the operator terminal (such as: stop, turn left, turn right, accelerate, decelerate), and the instructions may control the robot 10. This may allow a safe operation in hazardous situations and situations unknown to the robot 10.

In some embodiments, the images of the traffic lights can be used for inferring the timing between state changes. Thus, a plurality of images, taken at successive instances, such as every 10 ms, 100 ms, 1 s, can be used and can be advantageous to detect the pattern of the traffic light state changes. For example, the data processing device (which may be part of a server) can detect that the light of the traffic light stays red for 30 seconds and green for 10 seconds. The data processing device can infer this and can store such information on a memory. Next time the mobile robot detects the particular traffic light it "knows" the duration of the states of the traffic light. Thus, if the mobile robot detects a change from green to red, the mobile robot "knows" that after 30 seconds the traffic light will turn green again.

To put it simply, the mobile robot 10 can obtain images at an intersection, such as videos at an intersection, and based on this images, the duration of each state (i.e. the pattern on state changes) for a traffic light can be inferred. Further, the information related to the pattern of state changes can be used to make predictions about future states of the traffic light. It will be understood that these steps may be performed by a server building the map of traffic lights and equipping this map with additional information, and in particular rules that are followed by the traffic lights.

The state change patterns can also be detected between at least two traffic lights. That is, it is often the case that traffic lights are related (or synchronized) with each other. For example, a pedestrian traffic light and a car traffic light for the same road cannot be on the same time on the same state (such as on the green state), but they are synchronized such that one can be on the green state and the other on the red state. Further, a time delay can be present between the state changes. That is, if one changes from green to red after a time delay, for example 10 s, the other will change from red to green. The time delay can be present to make sure that the road is clear for the traffic participants that are allowed to pass the road by the traffic lights. To put it simply, it is often the case that traffic lights are synchronized with each other and the pattern of the traffic light state changes can be detected by the presently described technology. Such information regarding the pattern of state change between two or more traffic lights can be used to make predictions about a future state of a traffic light. For example, the mobile robot is required to traverse a road. The mobile robot 10, as any other pedestrian, can pass the road when the pedestrian traffic light for that road is in the green state. Further, the road is equipped with another traffic light that guides the vehicles to pass the road or not. As discussed, the present technology can detect the pattern of state changes between multiple traffic lights. Thus, it is "known" that when the vehicle traffic light changes from green to red, the pedestrian traffic light changes from red to green after specific time delay. Thus, once the vehicle traffic light changes from green to red and the mobile robot can detect such a change, it can be predicted that after said specific time delay the pedestrian traffic light will change from green to red.

The pattern on the traffic light state changes can also be inferred for traffic lights that belong to different roads or different intersections. Thus, based on the states of the traffic lights on a current intersection, the state of the traffic lights on another intersection can be predicted.

In some embodiments of the present invention, the mobile robot 10 uses the predicted traffic light state to execute an action. The mobile robot can be configured to require operator assistance while traversing a road, as usually traversing the road imposes a more complex or dangerous scenario. Thus, once predicting the next state change of a traffic light, the mobile robot knows when to ask for assistance. For example, the mobile robot asks for assistance from the operator a few seconds, such as 2 to 10 seconds, before the traffic light state changes.

Exemplary embodiments of the present invention will now be described with reference to FIGS. 1 to 8. These embodiments relate to the creation of the map, the detection of state changes of traffic lights and the usage of the maps and the traffic lights for operating the robot.

Figure 1:
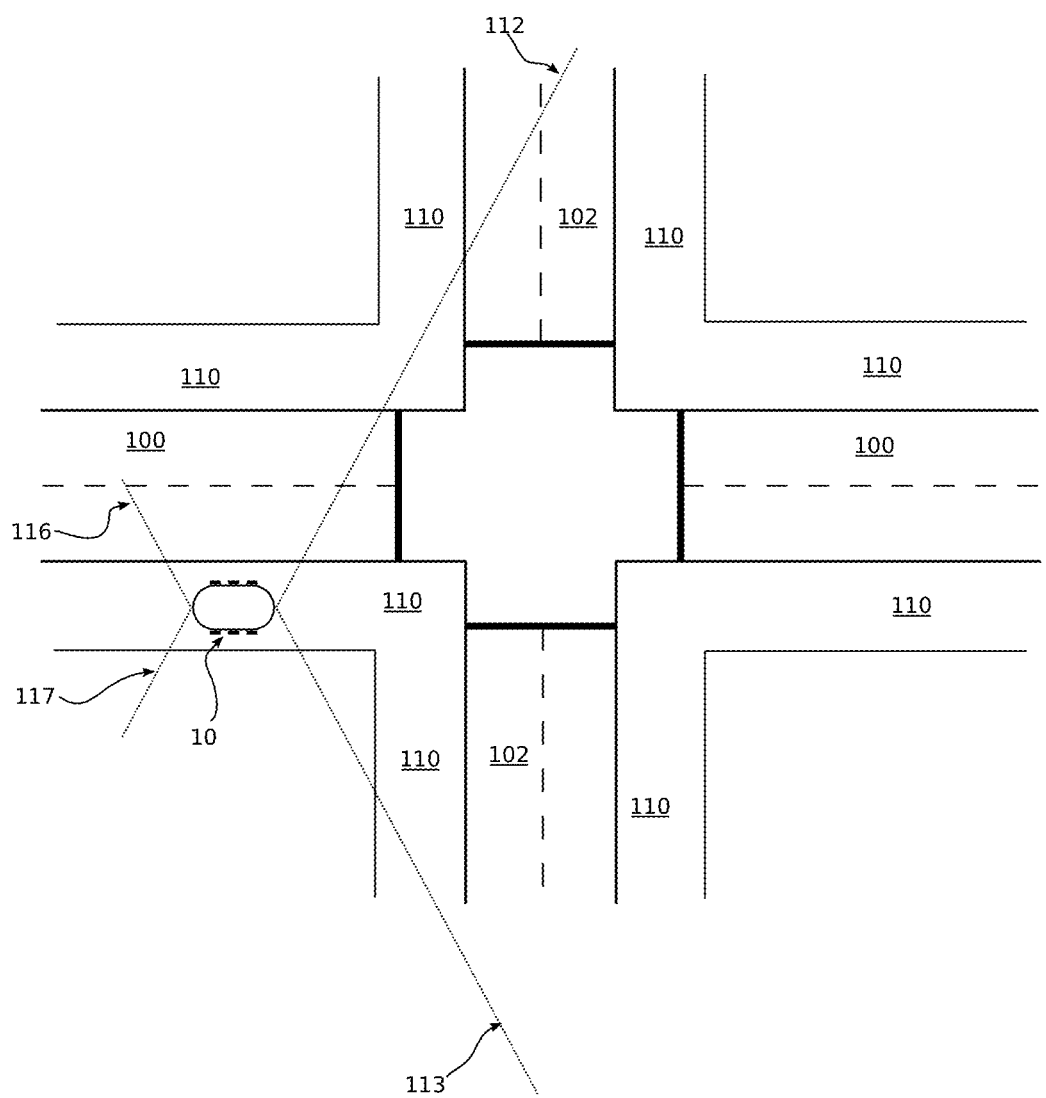
FIG. 1 depicts a robot operating in an environment comprising a road intersection.

FIG. 1 depicts a mobile robot 10 operating in a real-world environment. The real-world environment comprises two roads 100 and 102 that cross at an intersection. Next to the roads 100, 102 there may be provided sidewalks 110 and the robot 10 may typically travel on the sidewalks 110.

The mobile robot 10 can comprise at least one camera that can facilitate, among others, the localization and navigation of the robot 10. The cameras may be directed towards the front of the mobile robot 10 (front defined as the side of the robot towards the direction of movement of the mobile robot in a normal operation mode of the robot), wherein the cameras can provide to the mobile robot a front field of view as indicated by the bounding lines 112, 113. It should be noted that the front field of view herein refers to the smaller sector that is defined by the lines 112 and 113—i.e. area defined by the internal or smaller angle of lines 112 and 113 and the lines 112 and 113. Further, the mobile robot 10 can comprise another camera (or other cameras) directed towards the back of the mobile robot 10, wherein the cameras provide to the robot 10 a rear field of view as indicated by lines 116, 117. The mobile robot can also comprise other cameras that provide to the mobile robot 10 other fields of view.

That is, the mobile robot 10 can comprise at least one camera. The cameras can provide different fields of view to the mobile robot 10. Using the cameras, the mobile robot can capture images of its surroundings. For example, the mobile robot 10 can be configured to capture images of its surrounding to facilitate its localization and navigation based on visual localization and navigation techniques. In another example, the mobile robot 10 can be configured to capture images or record videos of its surroundings during a hazardous situation, such as during a malfunction of the robot 10, wherein said images or videos can be used as part of the incident report. While in the previous two examples the mobile robot captures images and/or videos without the direct purpose of capturing traffic lights, in yet another example, the mobile robot 10 can be configured to capture images and/or record videos of the surroundings to detect traffic lights in an environment.

The mobile robot 10 can localize itself on an initial or "raw" map. Thus, the mobile robot 10 can comprise information about its position when capturing photos. Thus, the images stored on the memory can also be associated with the respective position of the location where they were captured. This may also be referred to as the capturing location.

In other words, the mobile robot 10 during its operation can capture images of the surroundings. The images can be stored on a memory that the mobile robot 10 can have access to. Such images can be used by the mobile robot 10 to detect traffic lights and a map of traffic lights can be created using these traffic lights.

Figure 2:
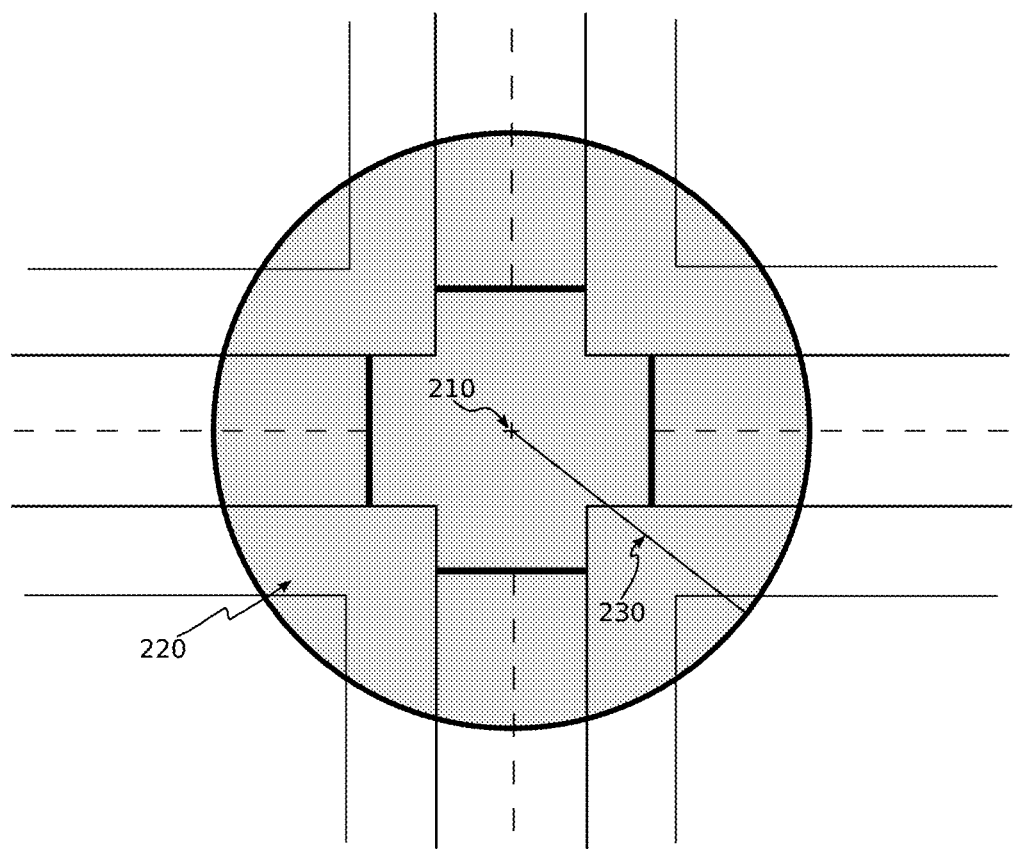
FIG. 2 depicts an area of interest of the environment of FIG. 1.

FIG. 2 depicts the environment of FIG. 1 wherein an area of interest 220 is highlighted. The area of interest 220 for creating a map of traffic lights as illustrated in FIG. 2 can be a disk (i.e. the region on a plane bounded by a circle) defined by the center 210 and the radius 230. The center 210 can be the center of the intersection 210 and the radius 230 can comprise a length in the range of 10 to 100 meters. The area of interest 220 can be configured such that it can cover the whole intersection. The area of interest 220 can be configured to maximize the likelihood that the traffic lights of a road or an intersection are in the area of interest 220. For example, it is unlikely for the traffic light of an intersection to be far from the intersection, such as 200 meters away from the intersection.

The area of interest 220 for an intersection or a road can be defined based on the topology of the road or intersection. For example, a large intersection would have a larger area of interest 220 compared to a smaller intersection.

The area of interest 220 can be used to facilitate or optimize the process of detecting traffic lights. That is, since the area of interest 220 can comprise the highest likelihood of comprising traffic lights, only images captured within such an area can be processed for detecting traffic lights. For example, in FIG. 1 the mobile robot 10 comprises two fields of view: the front field of view as bounded be lines 112 and 113 and the rear fields of view as bounded by lines 116 and 117. Since the rear field of view of the mobile robot 10 does not comprise the area of interest 220, images captured in the direction of the rear field of view may not be considered for detecting traffic lights. Further, if the mobile robot 10 is far away from the area of interest 220 such that none of its fields of view can capture images of the area of interest 220, then all the images captured by the mobile robot 10 on that location may not be considered for checking for traffic lights.

Figure 3A:
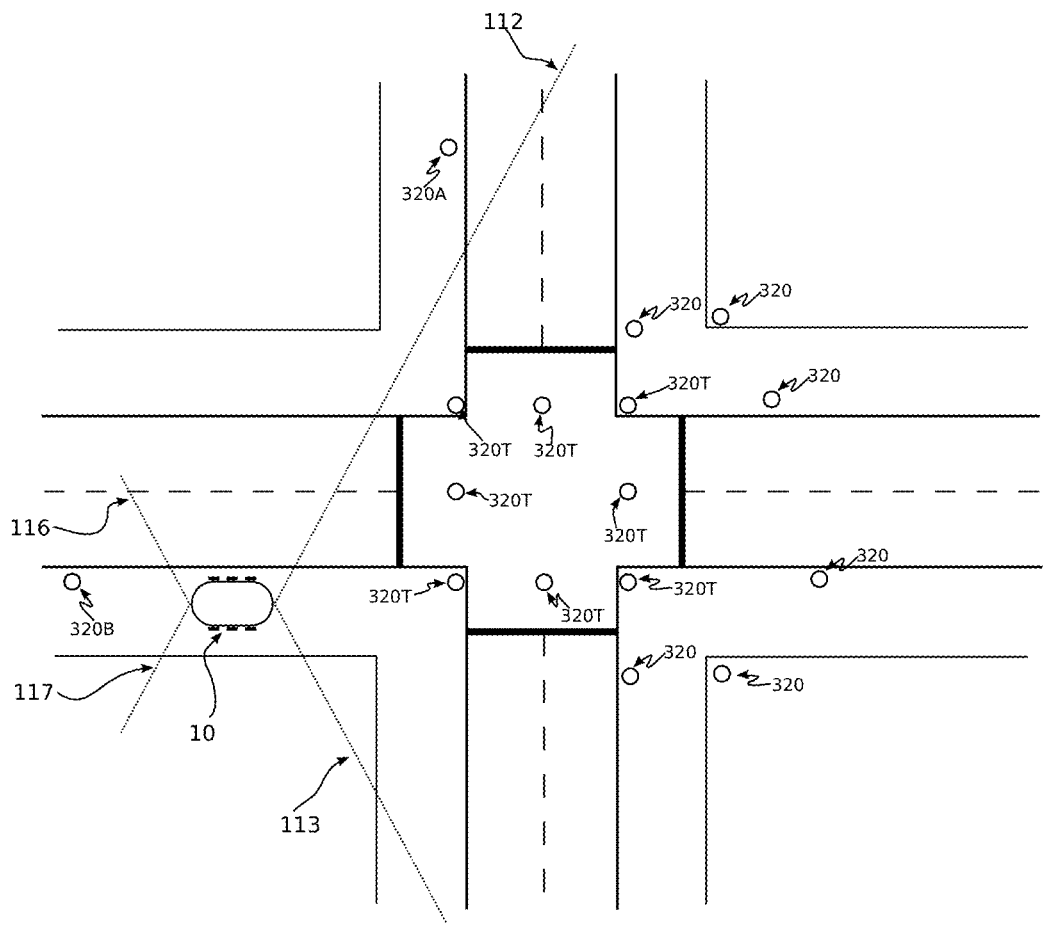
FIG. 3a depicts the environment of FIG. 1 with visual features that may be extracted from the images obtained on the environment.

FIG. 3a depicts the environment of FIG. 1 wherein some visual features that can be extracted from images are schematically shown. That is, FIG. 3a depicts a mobile robot 10 operating in a real-world environment. As discussed, the mobile robot 10 can comprise at least one camera that can provide to the mobile robot 10 the field of view as defined by lines 112 and 113. The mobile robot can additionally comprise at least one other camera that can provide to the mobile robot the field of view as bounded by lines 116 and 117. The mobile robot can also be provided with other fields of view, such as, on the direction of the sides of the mobile robot 10 (not depicted in the figure).

Visual features 320 are schematically depicted in the environment in FIG. 3a by the circles 320. The visual features 320 can comprise specific shape patterns, such as straight lines or polygons that belong to objects on the environment comprising a shape similar to the specific shape pattern. The visual features 320 can be bright spots on an image, such as lights that can belong to light sources on the environment. Visual features 320 can be objects, buildings, trees, traffic participants, traffic lights, traffic signs or any other object that can typically be present on an intersection. In other words, visual features 320 can be features on an image that can indicate to the robot 10 that they can belong to a traffic light, or features on an image that need to be checked if they belong to a traffic light or not. For example, a traffic sign 320 or a street light 320 may be relatively similar to a traffic light and may thus require a high level of attention. Thus, the part of the image comprising the specific visual features 320 may need to be analyzed in more detail to infer if it belongs to a traffic light or not.

Figures 3B, 3C:
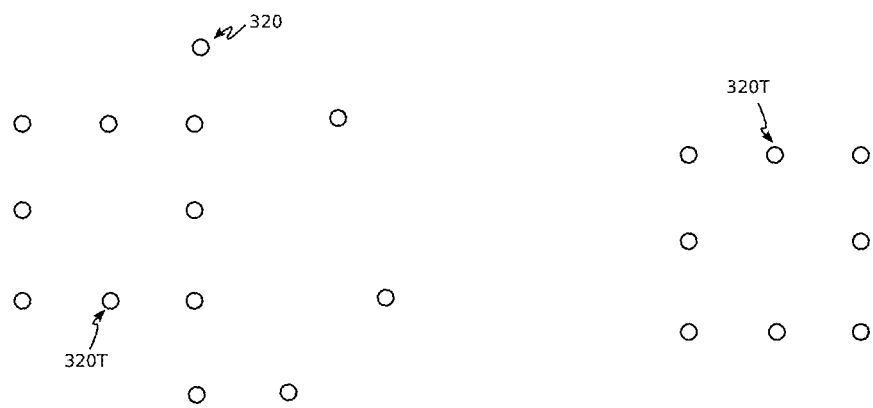
FIG. 3b depicts visual features of FIG. 3a positioned in the area of interest.
FIG. 3c depicts the visual features of FIG. 3a that belong to a traffic light.

FIG. 3b depicts the visual features 320 of FIG. 3a that can be detected and/or extracted from an image by the mobile robot 10. More specifically, in FIG. 3b only the visual features that are positioned within the front field of view of the mobile robot are depicted. That is, the visual features 320A (refer to FIG. 3a) is not depicted in FIG. 3b. Visual features 320A is not in any of the depicted fields of view of the mobile robot 10 in FIG. 3a, and thus it cannot be detected by the mobile robot 10. Put simply, the visual feature 320A is out of sight of the cameras of the mobile robot 10. Furthermore, the visual feature 320B (refer to FIG. 3a) is not depicted in FIG. 3b. Even though visual feature 320B is positioned within one of the depicted fields of view of the mobile robot 10, the visual feature 320B is not depicted in FIG. 3b. The reason for this is that the visual feature 320B is positioned in the rear field of view of the mobile robot 10. As discussed in relation to FIG. 2, the rear field of view does not comprise the area of interest 220, where it is highly probable for a traffic light to be positioned. Thus, the visual feature 320B can be neglected for further analysis. Put simply, FIG. 3b depicts only some of the visual features 320 of FIG. 3a, that can make a good candidate for being a traffic light—i.e. that have a high probability of being a traffic light, or that comprise a probability above a threshold level of being a traffic light.

Thus, in the depicted scenario of FIGS. 3a and 3b, after the mobile robot 10 obtains the images, a decision need to be made or calculated for each of the visual features 320 depicted in FIG. 3b, if they belong to a traffic light or not. This process can be facilitated by at least one image of a traffic light, preferably a plurality of images of traffic lights that comprise different types of traffic lights with different colors, captured in different angles, at different times of the day or light conditions. In other words, a diversity in the images of the traffic lights can be advantageous. The detection of traffic lights on an image can be performed using neural network algorithms. Thus, based on the images and by using one or more neural network algorithms, traffic lights and their states may be detected.

In FIG. 3c the visual features 320 of FIGS. 3a and 3b that belong to a traffic light are depicted. FIG. 3c depicts only those visual features of FIGS. 3a and 3b for which it has been inferred that they belong to traffic lights. In other words, the visual features 320 depicted in FIG. 3c can represent traffic lights with a probability of at least 98%, or 99% or 100%. For a better illustration, in FIGS. 3a, 3b and 3c the visual features 320 that belong to a traffic light are numerated with the numeral 320 followed by the character T, i.e. 320T.

It should be noted that FIGS. 3a, 3b and 3c illustrated only an exemplary manner of detecting traffic lights on an image. It was based on the optimization step of defining only some parts of the image (i.e. the visual features 320) that comprise a high probability of representing a traffic light. It was further based on the other optimization step of neglecting some of the visual features 320, such as the visual feature 320B, that comprise a very low probability of representing a traffic light. However, in other embodiments, the upper mentioned optimization steps may be neglected. For example, the whole image may be searched for detecting a traffic light. In yet another example, all the visual features 320 that were detected for inferring the presence of a traffic light may be used. In yet other embodiments, other optimization steps that do not change the general principle of the invention may be used for facilitating the traffic light detection on an image.

By the above means, traffic lights may be detected and may be added to a map, to thereby generating a map comprising traffic lights. Thus, a map of traffic lights may be generated.

Figure 4:
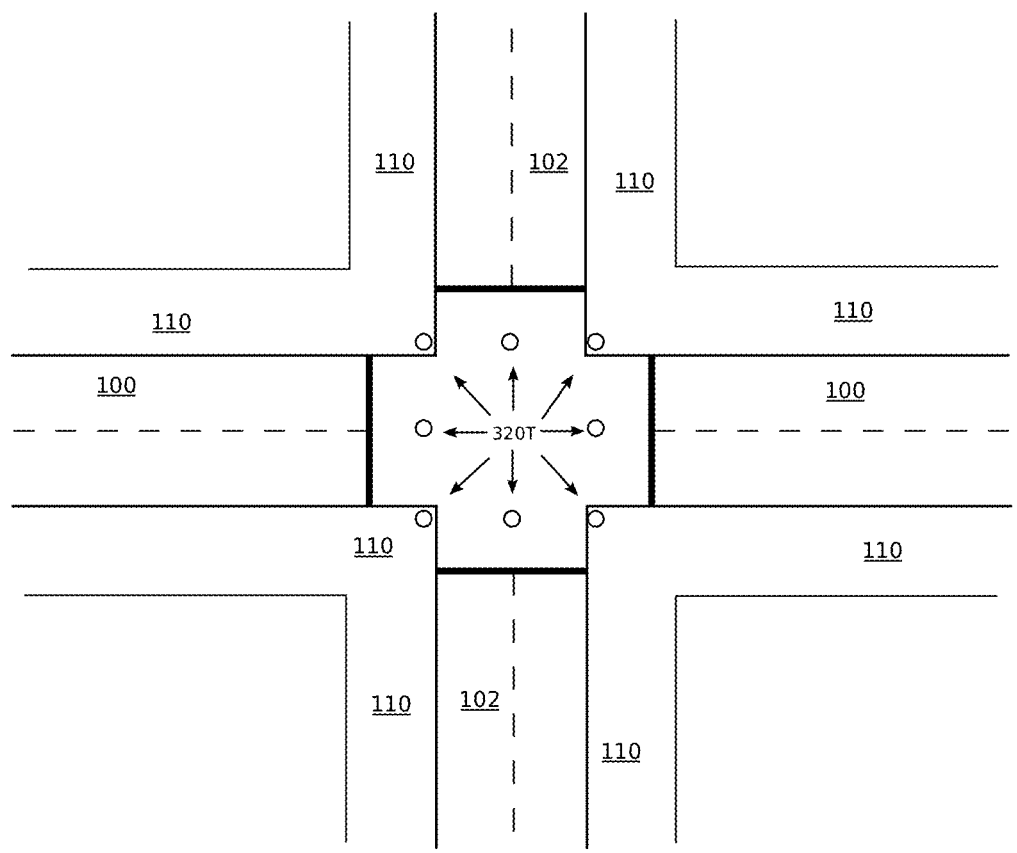
FIG. 4 depicts a map of traffic lights.

FIG. 4 depicts an exemplary map comprising traffic lights that may be created by the above measures. More particularly, FIG. 4 depicts a map of the environment depicted in FIG. 1. In addition to the roads 100 and 102 and the sidewalks 110 of the environment of FIG. 1, the map depicted in FIG. 4 comprises also the detected traffic lights (refer to FIG. 3C).

In order to create a map comprising traffic lights, such as the one depicted in FIG. 4, the relative position between the detected traffic lights and the relative position between the traffic lights relative to other map elements such as the roads 100 and/or 102 may be determined. That is, both the presence of a traffic light on an image (as was discussed with reference to FIGS. 3a, 3b and 3c), and the location of traffic lights can be detected. In some embodiments, the mobile robot can localize itself the moment an image was captured by its cameras. Thus, the image can be associated with that location. For example, the mobile robot 10 "knows" that the traffic lights represented by the visual features 320 in FIG. 3c, belong to the environment of FIG. 1. The mobile robot 10 can comprise such information because it localized itself as being positioned in the environment of FIG. 1 while capturing the images (that is, the mobile robot 10 has access to a map and can localize itself on the map). Furthermore, based on the position of the respective visual feature 320 representing a traffic light on the image the direction of the traffic light relative to the mobile robot 10 can be determined. Put simply, based on the position of the traffic light on the image, a direction can be inferred (i.e. a straight line starting from the center of the mobile robot, or a straight line starting from the camera) wherein the traffic light can be positioned. Furthermore, using stereo-cameras and/or additional sensors the distance between the traffic light and the mobile robot can be determined resulting in a unique place for the position of the traffic light. Thus, the traffic light can be mapped. It should be noted, that herein an exemplary method of mapping a traffic light is provided. However other mapping methods that do not change the general principle of the invention can be used.

In FIG. 5a, the mobile robot 10 operating in the environment of FIG. 1 is depicted. In FIG. 5a the roads 100 and 102 intersecting each other are depicted. Again, the mobile robot 10 driving (or travelling) on the sidewalk 110 of the road 100 is depicted. The mobile robot 10 comprises a front field of view bounded by lines 112 and 113 as described in conjunction with FIG. 1. For the purpose of not overloading the figure only some of the traffic lights present in the intersection are shown. More specifically, the exemplary intersection comprises eight traffic lights (refer to FIG. 3a, FIG. 3c or FIG. 4). However, in FIG. 5a only some (i.e. five) of the traffic lights of the intersection are shown. Additionally, in FIG. 5a, a vehicle 70 driving on the road 102 is depicted.

Figure 5B:
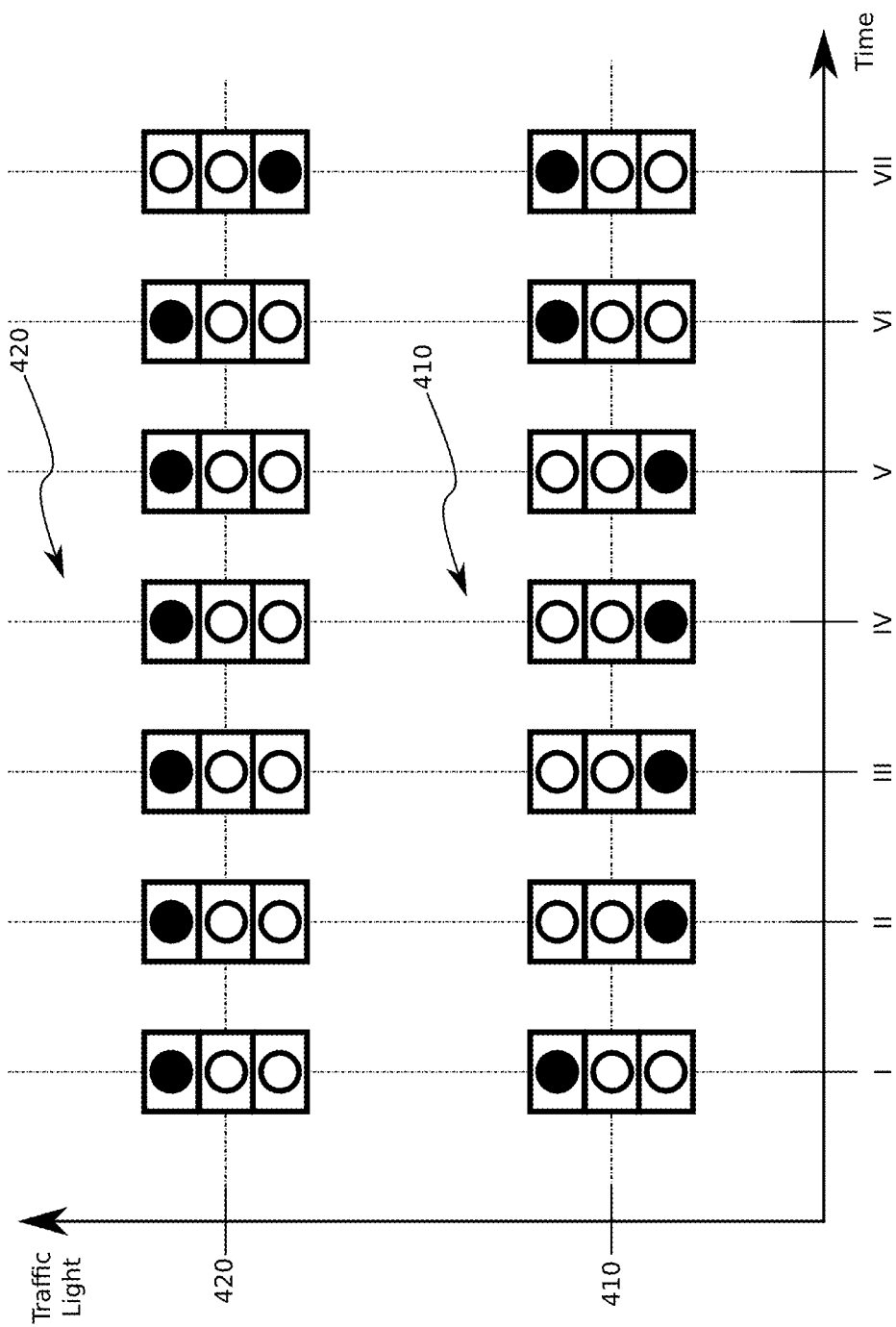
FIG. 5b depicts a timing diagram of state changes of the traffic lights.

With reference to FIGS. 5a and 5b, a method of detecting the pattern between traffic light state changes will be described. For sake of brevity only the state changes between the traffic light 410 and the traffic light 420 will be considered. For simplicity the states of the other traffic lights will be neglected in the following description. However, it should be understood that the method can also be applied to some or all of the traffic lights that are present in the intersection, or, in fact, may also consider traffic signs at additional intersections. That is, the mobile robot can detect the state change patterns of one traffic light (as will be described in detail with reference to traffic light 410), two traffic lights (as will be described in detail with reference to traffic light 410 and traffic light 420), or more than two traffic lights (detailed description omitted), or all of the traffic lights of the intersection (detailed description omitted) can be inferred. Additionally also traffic lights of other intersections may be taken into account.

It should also be understood, that the described embodiments with reference to the figures relate to an environment comprising an intersection. It should be noted that the embodiments of the present technology can also be applied on other environments that can comprise a traffic light, such as for example, at a road crossing.

Furthermore, in FIG. 5a and FIG. 5b the traffic lights are depicted comprising 3 lights, wherein the lowest one (i.e. the one closer to the ground) is the green light, the light in the middle is the orange light and the light being highest (i.e. furthest from the ground) is the red light. In other words, the standard convention of the traffic lights is used herein. Throughout the text, when the green light of the traffic light is on, the traffic light is referred to be in the green state. When the red light of the traffic light is on, the traffic light is referred to be in the red state. When the orange light of the traffic light is on, the traffic light is referred to be in the orange state. In FIG. 5a and FIG. 5b only one of the types of the traffic lights is depicted (comprising 3 lights: red, orange and green). It should be noted that embodiments of the present invention can also be used with other types of traffic lights, such as traffic lights comprising two or one light, traffic lights comprising animations or figures on their signaling sections, pedestrian traffic lights, vehicle traffic lights, other traffic participants traffic lights (such as traffic lights intended specifically for trams or buses).

As discussed, the mobile robot 10 can comprise at least one camera. The at least one camera can provide to the mobile robot a field of view, depicted in FIG. 5a by the area created by the internal angle between lines 112 and 113 and the lines 112 and 113. Using the camera, the mobile robot can capture images of the surroundings, and particularly images of the field of view of the cameras. Thus, as depicted in FIG. 5a the mobile robot can capture images of the intersection and particularly of the traffic lights of the intersection, such as the traffic lights 410 and 420, since the intersection and particularly the traffic lights of the intersection, such as the traffic lights 410 and 420 are positioned within the field of view of the mobile robot 10.

To be able to detect patterns on the state changes of the traffic lights of the intersection, it can be advantageous that more than one image of the traffic lights can be captured by the mobile robot. It can further be advantageous that the images are captured successively, with a small time delay between them, such as for example 5 ms to 1 s. In some embodiments, the mobile robot 10 can be configured to record videos with a frame rate between 1 to 200 frames per second.

The images (or the frames of the video) can be used to detect the patterns on the light changes of the traffic light. By processing the images, the position of the traffic light on each image can be detected. In some embodiments, the mobile robot can be configured to not change the focus and/or view of its cameras while capturing said images (or videos) which can facilitate the process of detecting the traffic lights on the images. That is, a traffic light on the first image can be detected and the position found can be used to predict the position of the same traffic light on the next image. The mobile robot can comprise or have access to a map similar or identical to the one depicted in FIG. 4. Thus, if the mobile robot 10 can localize itself on such a map based on the relative position between the mobile robot 10 and the traffic light, detection of the position of the respective traffic light on the image can be facilitated. In yet other embodiments, the relative position between traffic lights and/or other elements on the first image can be used to predict the position of the traffic light on the next image. For example, from the first image the relative position between a traffic light and another traffic light and/or between a traffic light and a road on the image and/or the traffic light and the position of the mobile robot 10 can be determined. Using such relative positions determined on the first image, it can be determined which traffic light is which on the next image.

During or after the determination of the position of a traffic light on an image, its state can be detected, that is, it can be detected which of the lights of the traffic light is on. For example, using brightness thresholding the position of the light that is on can be determined. Then, the relative position between the light that is on and the traffic light can be used to determine which of the lights is on. That is, a bounding box (or any shape) can be defined representing the area with the highest probability of comprising the traffic light. Further, the position of the light that is on (using, for example, brightness thresholding) relative to the bounding box can be determined. Based on such information the state of the traffic light can be inferred. For example, if the light that is turned-on is positioned on the most lower section of the bounding box, this can provide a hint that the green light is on and the traffic light is on the green state. Additionally, or alternatively the color of the light that is on can be analyzed, to determine the state of the traffic light.

As discussed, the state of the traffic lights on each (or some) of the images that have be captured can be detected. Since the images can be captured in a successive manner, a traffic light state progress over time can be created. FIG. 5b depicts a time diagram of the states of the traffic light 410 and traffic light 420 of FIG. 5a. The diagram of FIG. 5a depicts the state of the traffic light 410 and 420 on different time instances, particularly on seven time instances. Information about the state of each of the traffic lights on each time instance can be extracted from images of the respective traffic lights that can be captured on the respective time instances. For example, the state of traffic light 410 on the time instance IV can be extracted from an image of the traffic light 410 that is captured on the time instance IV and the state of traffic light 420 on the same time instance IV can be extracted from an image of the traffic light 420 that is captured on the time instance IV.

The diagram of FIG. 5b comprises two axes: the vertical axis, also referred to (as indicated in the figure) as the Traffic Light axis and the horizontal axis also referred to (as indicated in the figure) as the Time axis. On the time axis, seven time instances are indicated by Roman numerals I, II, III, IV, V, VI and VII respectively. Herein it is assumed that the time instances are ordered according to time, from the earliest (time instance I) to the latest (time instance VII). That is, time instance I is the earliest, time instance II is later than time instance I but earlier than time instances III to VII, time instance VII is the latest and so on. On the Traffic Light axis, the two traffic lights that were considered on FIG. 5a are indicated, wherein in the lower part the states of the traffic light 410 are depicted and in the upper part of the graph the states of the traffic light 420 are depicted. A guiding grid with dotted lines is provided to facilitate the reading of the graph.

With reference to FIG. 5b firstly the pattern detection of one traffic light, i.e. traffic light 410, will be described followed by the description of the detection of the pattern between two traffic lights, specifically between traffic light 410 and traffic light 420.

On an image of the traffic light 410 on time instance I a data processing device can determine the traffic light as being in the red state (i.e. the red light of the traffic light 410 is turned on). On an image of the traffic light 410 captured at time instance II the data processing device can determine the traffic light as being in the green state (i.e. the green light of the traffic light 410 is turned on). The data processing device can detect the state change from red to green of the traffic light 410 and can save the time of the time instance II on a memory. Proceeding on time instance III, it can be detected that the traffic light 410 stays in the green state. Also, at time instance IV and V it can be detected that the traffic light 410 stays in the green state. At time instance VI it is detected that the state of the traffic light is red, inferring that a state change from green to red happened between time instance V and time instance VI. Thus, two state transitions of the traffic light 410 are detected, the first one being from red to green and the second one being from green to red. By subtracting the time of the second transition and time of the first transition, the duration that the green light of the traffic light 410 stays on can be determined. That is, the difference between the time of the time instance VI from the time of the time instance II provides an approximate for the time that the traffic light 410 stayed on the green state. By continuing the observation further, that is beyond time instance VII until at least one other transition from red to green is observed the duration that the traffic light 410 stays in the red state can be determined. Or by having started the observation before time instance I, since at least the first transition from green to red before time instance I is observed, the duration that the traffic light 410 stays in the red state can be determined. In this manner, the duration of each of the states of the traffic lights can be detected and thus the pattern of state changes of a traffic light can be determined.

In a similar manner the pattern of state changes of traffic light 420 can be determined by the data processing device.

In the following, the determination of the pattern of state changes between two or more traffic lights will be described. It is often the case that traffic lights are synchronized with each other. For instance, in FIG. 5*a* the traffic light 410 concerns the traverse of road 102 by pedestrians, cyclers, and mobile robots 10. That is, the mobile robot 10 or other traffic participants traveling on the side of the roads, such as on the sidewalk 110, can traverse the road 102 on the provided zebra crossing of road 102. On the other hand, the traffic light 420 concerns vehicles or other traffic participants travelling on the road 102 and can provide or prohibit permission to such vehicles or other traffic participants to cross the intersection using road 102. For instance, the vehicle 70 can pass the intersection and can continue driving on road 102 only if allowed by traffic light 420.

Thus, for a better guidance of movements of the traffic participants the traffic lights 410 and 420 can be synchronized with each other. That is, the traffic light 410 and 420 have to be on opposite states, i.e. cannot be both on the green state or both on the red state (except for some safety interval). In some instances, the traffic lights 410 and 420 can be synchronized such that when one of them changes state from red to green the other instantly changes from green to red. However, it is often the case with such traffic lights that a time delay is present between the state change of the first traffic light to the state change of the second traffic light (for example, to make sure that the road is clear for the traffic participants that will be allowed crossing).

It can be seen from FIG. 5*b* that at time instance VI when the traffic light 410 changed the state from green to red, the traffic light 420 continues staying in the red state. At time instance VII, the state change from red to green of the traffic light 420 can be determined. It can be inferred that the difference between time instance VII and time instance VI provides the time between the state change from green to red of traffic light 410 and the state change from red to green of traffic light 420. In a similar manner the time between the state change from red to green of traffic light 410 and the state change from green to red of traffic light 420 can be determined. Thus, based on the pattern of state changes of individual traffic lights, the pattern of state changes between two or more traffic lights can be determined.

In the above description, the traffic lights transitioned only between two states: red state and green state, while the orange state was neglected. This was done for sake of brevity. In a similar manner the pattern of state change including the orange state can be determined.

Figure 6:
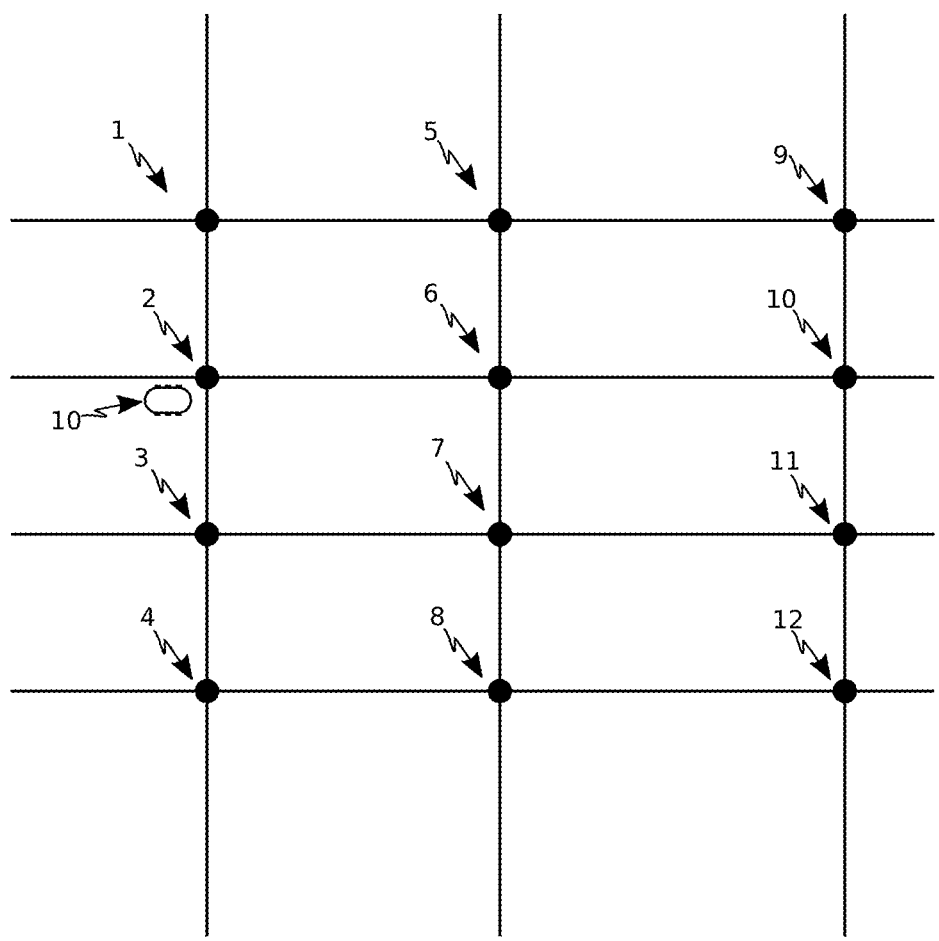
FIG. 6 depicts the mobile robot operating in an environment comprising multiple intersections.

FIG. 6 depicts a schematic representation of the mobile robot 10 operating in an environment comprising multiple intersections. The intersections are numbered with numerals 1, 2, 3, . . . , 12. The mobile robot 10 is positioned near or at intersection 2. Furthermore, some or all of the intersections 1 to 12 are equipped with at least one traffic light.

As discussed, the pattern of state changes of one traffic light or the pattern of state changes between multiple traffic lights at one intersection (refer to FIG. 5*a* and FIG. 5*b*) can be determined. In a similar manner, the pattern of traffic light state changes between traffic lights that are positioned on different intersections, or that can belong to different roads, can be determined. Determining the pattern of traffic light state changes between traffic lights that are positioned on different intersections imposes additional challenges compared to the case when determining the pattern of traffic light state changes between traffic lights that are positioned in same intersection. When traffic lights are positioned on the same intersection, as is the case of traffic lights 410 and 420 (refer to FIG. 5*a*), they can be captured within one image. Thus, the data processing device can be able to infer their timing since it can "know" the states of both the traffic lights at different time instances. In the case of traffic lights being positioned at different intersections it can often be the case that the mobile robot 10 cannot observe them at the same time or on the same image. For instance, since the mobile robot 10 is positioned at intersection 2 on FIG. 6, it can only observe the traffic lights of intersection 2. Usually the field of view of the mobile robot 10 towards the traffic lights of the other intersections can be obstructed, or the other intersections can be out of the field of view of the mobile robot 10, or the intersections can be very far so that they cannot be detected by the mobile robot 10.

Thus, an additional manner is required that can provide the state of the traffic lights on different intersections, in order to determine the pattern of state changes between the traffic lights of such different intersections.

In some embodiment, a second mobile robot can be positioned at another intersection, for example on intersection 6. The mobile robots can be configured to both communicate with a data processing device by exchanging data through a communication channel, such as for example wirelessly though the internet. The mobile robot positioned on intersection 6 can transmit (e.g., on live time) to the data processing device the status of the traffic lights of intersection 6, while the mobile robot 10 observes the traffic lights of intersection 2 (or vice versa) and transmits data concerning the traffic lights of intersection 2 to the data processing device. Since the data processing device can comprise the status of traffic lights of both intersections, the data processing device can create a timing diagram similar to the one depicted in FIG. 5*b* and can thus determine the pattern of state changes.

In another embodiment, instead of a second mobile robot a human operator can provide the status of the traffic light on a further intersection. The human operator can determine the status of the traffic light on another intersection either by observing images or videos, such as, live images or videos, of the traffic light on another intersection or by being on the said intersection and directly observing the status of the traffic light on that intersection.

Thus, the found patterns between traffic lights of different intersections can be used to infer patterns between different intersections. For example, if the pattern between traffic lights of intersection 2 and intersection 6 is known and the pattern between intersection 6 and intersection 11 is known the pattern between intersection 2 and intersection 11 can be inferred.

In general, as described in the above, embodiments of present technology provide a manner of creating a map of traffic lights. Further, the pattern of state changes of at least one traffic light, or more than one traffic light that can belong to the same intersection or that can belong to different intersections, could be detected and inferred. In some embodiments, images taken at successive time instants and/or video recording(s) can be used.

A map comprising such traffic lights can then be used to later predict future state changes of traffic lights. That is, detecting the light patterns can then allow to predict the time of the next state change of one or more traffic lights. Knowing the next state change of a traffic light before it happens, such as 2-10 seconds ahead, can allow the mobile robot to execute particular actions. A general description of the method of predicting a state change and executing an action based on the predicted state change is provided in the schematic flowchart of FIG. 7.

Figure 7:
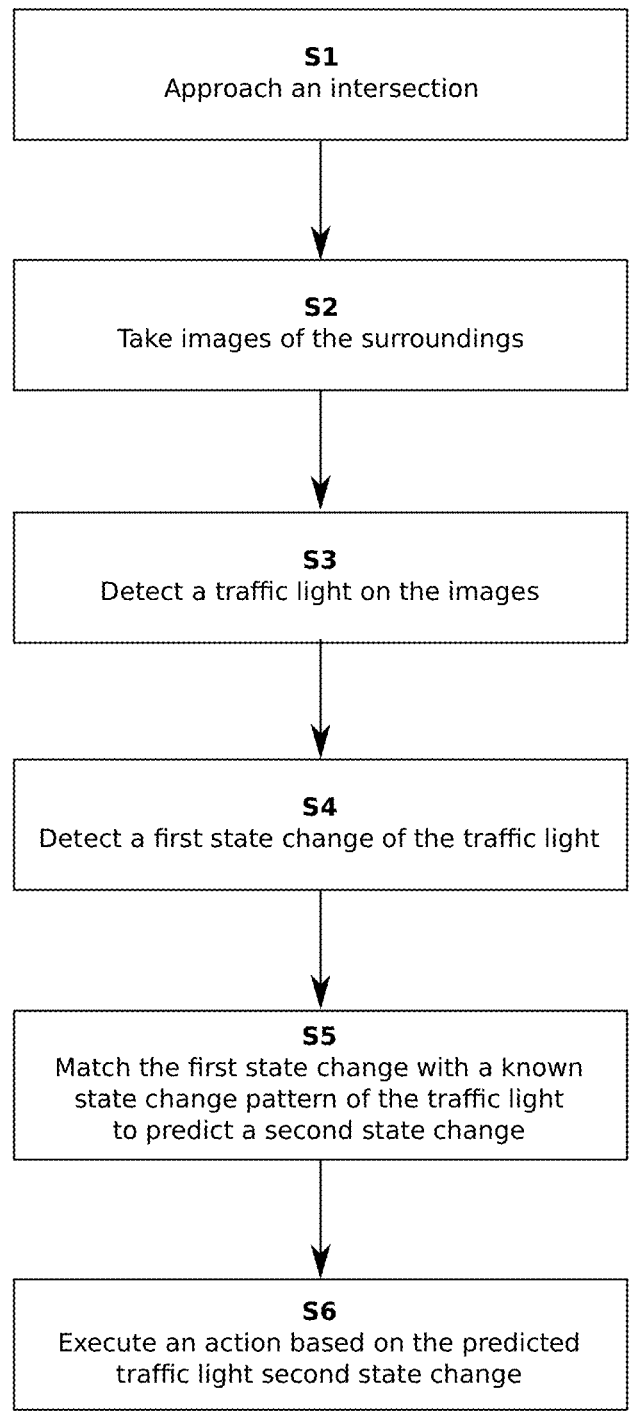
FIG. 7 depicts a schematic flowchart of using traffic lights for intersection crossing optimization.

Referring to FIG. 7, in a first step S1 the mobile robot 10 can approach an intersection. As described (refer to for example, FIG. 1) the mobile robot 10 can comprise at least one camera that can provide to the mobile robot images of the surroundings (or at least images of the surroundings within the fields of view of the cameras). Thus, in a step S2 the mobile robot can take images of the surroundings. Such images can capture the view in front of the mobile robot 10, for example images on the front field of view as depicted by lines 112 and 113 (refer to, for example, FIG. 1). In yet another example, the mobile robot can adapt its own orientation or the orientation of the cameras, or can comprise more than one camera capturing different directions, to capture images of its surroundings on different directions and particularly images of the area of interest 220 (refer to FIG. 2). It can be advantageous that more than one image is captured by the mobile robot, and the images are taken in successive time instants. That is, the images can be taken one after another with a time delay among them, such as for example the images are taken with a frequency of 1 to 200 Hz. For example, the cameras can be configured to capture videos of the surroundings of the mobile robot 10.

Further, there may be provided a data processing device that can be configured to process images, for example, for the purpose of detecting and/or extracting different features or patterns from processed images. The mobile robot 10 can comprise the data processing device configured to process images (i.e. configured to execute an image processing algorithm). Thus, in a step S3 the mobile robot 10 can detect traffic lights from the images captured in step S2. More particularly, the mobile robot 10 can detect a traffic light on the captures images and can determine a location of the traffic light on the images. Based on the location of the traffic light on the images, a capture location (i.e., the location of the robot 10 while capturing the images), and optionally other parameters (such as the size of the traffic light on the image), the location of the traffic light can be determined. Thus, the detected traffic light may be assigned to a mapped traffic light. This may then also further facilitate the localization of the traffic light in the image, and the subsequent determination of the state of the traffic light.

That is, the mobile robot 10 can identify the presence and/or position of at least one traffic light or at least of the traffic light that provides (or denies) permission for crossing the road that the mobile robot 10 intends to cross. The detection of position of the traffic light (or traffic lights) on the images can allow the mobile robot to infer the position of the traffic light (or traffic lights) on a map the mobile robot 10 has access to and/or the position of the traffic light (or traffic lights) in the real world. Thus, the mobile robot can be able to identify the traffic lights that can be present and detected on the images (or videos) the mobile robot 10 can capture.

Generally, it will be understood that the robot 10 may have access to a map of traffic lights that has been created previously, e.g., by the steps described above. Further, it will be understood that the creation of the map typically is performed by a server. That is, while mobile robots 10 may collect the images of the traffic lights, the step of creating the map (e.g., adding the location of the traffic lights to an existing map), may be performed by a server. Thus, a map of traffic lights may be created by the server.

When travelling in an environment and intending to use the map (to predict future state changes), the mobile robot 10 may have access to the map. That is, the robot may access the map and may thus be able to obtain information relating to the locations of traffic lights.

This information may be used to facilitate the detection of a traffic light. By accessing the map, the robot 10 may obtain information on the location of traffic lights. When the robot then captures images at (or close to) the location of a mapped traffic light, the robot may use this information to search the images captures at such location for the presence of traffic lights. Thus, the map of traffic lights may also facilitate the live detection of traffic lights. Further, once a traffic light is found by the robot, it may be assigned to one of the mapped traffic lights. That is, for a traffic light encountered by the robot, it is determined to which mapped traffic light it corresponds.

The mobile robot 10 can further be configured to detect a state change of a traffic light based on the captured images (step S4). Again, it will be understood that the detection of such state changes is also easier when having access to the map of traffic lights and therefore being able to determine where exactly to look for such state changes. More particularly, to detect state changes of a traffic light, the mobile robot 10 can adapt its own orientation or its cameras orientation such that the traffic lights of the intersection or at least some of the traffic lights of the intersection are within the field of view of the cameras, i.e. are captured in all or at least some of the captured images. Using brightness thresholding or color identification or other similar algorithms the mobile robot can detect which of the lights of a traffic light is turned-on and thus can infer the state of the traffic light. The mobile robot 10 can infer the state of the traffic light for each of the images (or for each of the frames of the videos) that captured the traffic light. For optimizing such a process some of the images (or frames of the video) may be neglected. For example, one of every two frames of the video may be considered. Usually the higher the number of considered images the higher can be the accuracy on inferring the time the state change happened. Thus, by inferring the state of the traffic light on an image (or on the frame of a video) and by comparing such a state with the state of the traffic light on the previous image the state change can be detected.

The detection of the first state change can be advantageous as it can allow the mobile robot 10 to synchronize with the traffic light, more particularly with the internal timer of the traffic lights. That is, by simply detecting the state of the traffic light it can be hard (or even impossible) to predict the next state changes, as the mobile robot cannot know how long the traffic light was on that state (and thus cannot predict how long the traffic light will be on that state). In contrast, by observing a state change (step S4) the mobile robot can comprise more accurate information about the state of the traffic light and how long the traffic light has been on that state.

However, the information regarding how long the traffic light has been on a particular state cannot be enough for inferring an accurate prediction about the next state change of the traffic light. Further information regarding how much time the traffic light stays on that particular state can be advantageous. In other words, the pattern of state changes of the traffic light has to be known in advance before inferring the time of the next state change. In some embodiments, the state change patterns of a traffic light as described with reference to FIGS. 5a and 5b may have been previously detected.

Thus, in a step S5, the mobile robot matches the first change with a known state change pattern of the traffic light. As discussed, the mobile robot typically assigns a detected traffic light to a mapped traffic light. For the mapped traffic lights, the robot has access to information as regards their timing, i.e., rules governing their state changes. For example, the mobile robot 10 on step S4 detected that the traffic light changed its state from green to red. Further, the mobile robot "knows" (by having access to the corresponding information) that the traffic light it is observing stays on the red state for e.g. 75 seconds. Thus, the mobile robot 10 can infer that the traffic light will go to the green state 75 seconds after the first state change. In other words, based on a first state change and based on state change pattern information the mobile robot 10 can comprise or have access to, the mobile robot can predict a second state change of the traffic light, such as the next state change.

In the above steps only one traffic light was considered for predicting the state of a traffic light. However, it should be understood that more than one traffic light can be used for predicting the state of a traffic light. Furthermore, the traffic lights can be part of the same intersection or road or can belong to different intersections and roads (refer to FIGS. 5a, 5b and 6).

In the above, it has been exemplarily described that it was observed that the time of a traffic light in the red state is 75 seconds. It should be understood that this is to be regarded as a simple example. In fact, the traffic lights may not have a fixed frequency for changing their states. Instead, the timing of the state change may depend, inter alia, on the weekday, on the time of the day, and/or the traffic density. It will be understood that such complex patterns may also be taken into consideration by the present technology. That is, independent of the actual dependencies of the state changes, it may be possible to predict the next stage change, e.g., based on historical data of the subject traffic light and optionally also of other traffic lights.

Further, while in the above, it is said that the data processing device performed the estimations/predictions as regards the next change of a status of a subject traffic light, it should be understood that this is merely exemplary.

In a step S6 the mobile robot 10 is configured to execute an action based on the predicted traffic light second state change. Example of such actions will be provided in the following description.

In some embodiments, the mobile robot 10 is configured to drive fully autonomously on part of their traveling and on the other part of their travelling the mobile robots can drive partially autonomously and partially controlled by a human operator or fully controlled by the human operator. That is, in some cases a human operator can take control of the mobile robot and can control part of the mobile robot functionalities, such as the human operator can control the driving of the mobile robot among others. It is usually the case that the human operator takes control of the mobile robot 10 particularly in situations that impose more danger, or that are considered more dangerous, and that can be prone to possible accidents or other incidents. One such situation can be the mobile robot crossing a road.

It is often the case that when the mobile robot is in a hazardous situation, such as when crossing a road, an operator takes control of the mobile robot. In U.S. Pat. No. 9,741,010 B1 "System and method for securely delivering packages to different delivery recipients", among others, embodiments are discussed relating to a mobile robot travelling to a delivery location comprising the robot semi-autonomously and/or autonomously driving from an initial location to another location. During the semi-autonomous driving the mobile robot is controlled by an operator. This can be particularly advantageous in hazardous situations, such as the robot crossing a street with car traffic. In other words, it is often the case in the state of the art that during hazardous situations such as road crossings an operator terminal can take control of the mobile robot. That is, the operator terminal can take control of the mobile robot before the initiation of the road crossing. In such cases it is the operator that checks the traffic light status and when the green light turns on the operator controls the robot to cross the road. Thus, the attention of the operator is required not only during the road crossing but also before the road crossing for checking the traffic light status.

In some embodiments of the present technology, the mobile robot can use the predicted traffic light state change to require assistance from the operator (refer to step S6 in FIG. 7), some seconds (such as 2 to 10 seconds) before the next state change. This can shorten the time that the operator controls the mobile robot during a road crossing. That is, without traffic light state prediction the operator controls the mobile robot during the whole process of road crossing, comprising observing the traffic light, waiting for the green light of the traffic light to turn-on and crossing the road when the traffic light goes green. However, with state prediction, the operator can be notified by the mobile robot only some seconds before the light of the traffic light goes green. Thus, the autonomous time during a road crossing can be increased and the operator control time during road crossing can be decreased.

Furthermore, it can be advantageous that the mobile robot notifies the operator for the next traffic light state change some moments, such as a few seconds, before the state change happens. For example, the autonomous time during road crossing can be increased if the mobile robot notifies the operator at the instant the traffic light state change happens. That is, the instant the light of the traffic light goes green the mobile robot can signal the operator to take control of the mobile robot for crossing the road. Though indeed the autonomous time is increased in such a scenario, it may cause further problems. The operator may need some time, to prepare for taking control of the mobile robot. Thus, the mobile robot cannot start passing the road instantly when the light goes green, if the mobile robot notifies the operator about the state change at the instant the state changes. This may be problematic, particularly in cases where green light stays on for short periods of time, which may result on either the mobile robot to miss the green light and thus have to wait for the next cycle, or the light goes red while the robot has not crossed the road yet, which can cause accidents or other incidents. Furthermore, since the mobile robot cannot instantly start crossing the road it may increase the total time that the mobile robot needs to travel to its destination.

Figure 8:
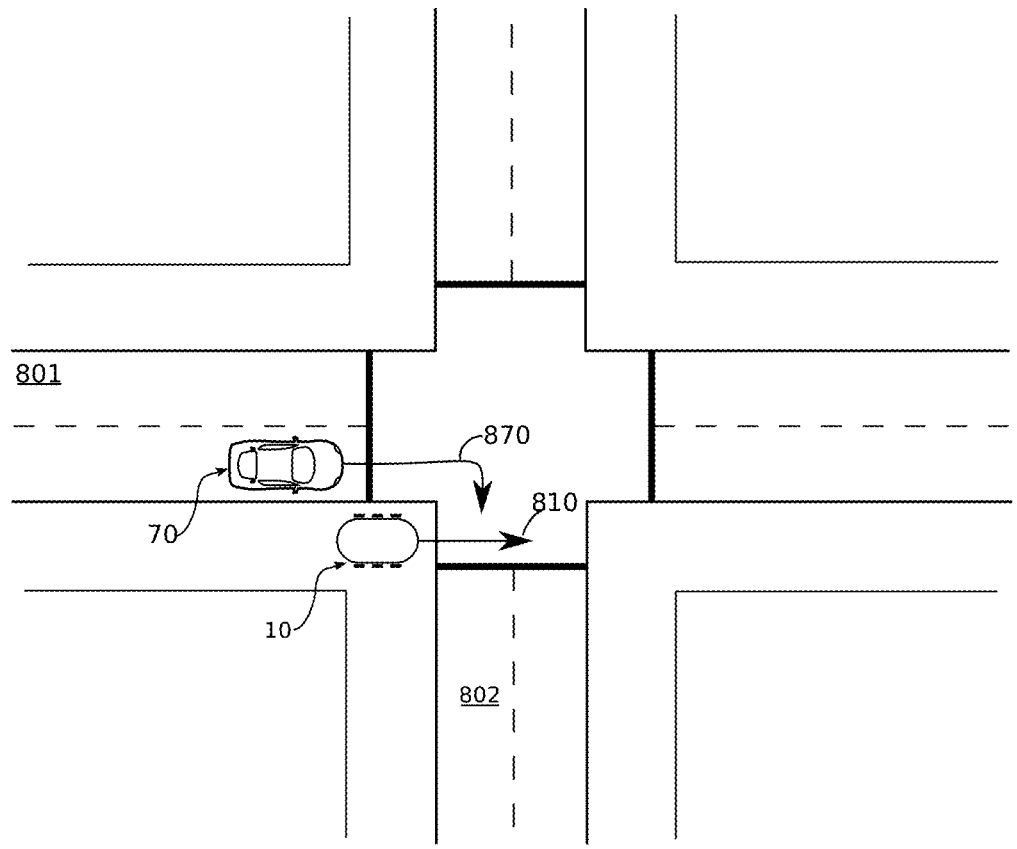
FIG. 8 depict a turning car hazardous situation that can be avoided by embodiments of the present technology.

Yet another problem accompanied with the case when the mobile robot does not start crossing the road instantly when the light of the traffic light goes green, is illustrated in FIG. 8. FIG. 8 depicts two intersecting roads 801 and 802. Further, a vehicle 70 driving in road 801 is depicted. The vehicle 801 needs to turn from road 801 to road 802 as depicted by the turning vehicle direction arrow 870. Further a mobile robot 10 is depicted that needs to cross the road 802 as depicted by the mobile robot direction arrow 810. It is often the case that the traffic lights of an intersection will provide at the same time permission for crossing a road to the turning cars and to the pedestrians. That is, it is often the case that on a situation similar to the one depicted on FIG. 8 both the turning car 70 and the mobile robot 10 will have simultaneous permission to cross road 802. However, such a conflict is solved as the vehicles will be obliged to wait for all the pedestrians or mobile robot 10 or cyclists to cross the road first and then the vehicle would turn. In the case of FIG. 8, the mobile robot 10 has priority over the vehicle 70 to cross the road. However, in cases the mobile robot 10 does not start crossing the road instantly when the traffic light goes green, it may be an indication to the driver of car 70 that the mobile robot does not intend to cross the road. So, the vehicle 70 would start turning. By the time the vehicle 70 starts turning the mobile robot 10, controlled by the operator, can start moving which may result in possible accidents. Or in the most common scenario the operator would notice the car 70 turning and thus would have to wait for the car 70 to turn which results in a delay on crossing the road (and thus a delay on arriving at destination) or on a miss of the green light and thus the mobile robot and/or the operator would have to wait for the next cycle.

Put simply, on one hand the prediction of the next state change of a traffic light is used to increase the autonomous time of a mobile robot during a road crossing and thus to decrease the time required for an operator to control or assist a mobile robot during a road crossing. On the other hand, the prediction of the next state change of a traffic light is used to be able to notify the operator moments before the state change, such as 3-10 seconds before the light of the traffic light goes green, to provide time to the operator to prepare for taking control or assisting the mobile robot. In this manner, the mobile robot controlled or assisted by the operator can start crossing the road immediately when the light goes green which may result in a faster time for arriving to the destination and can also avoid the hazardous situation described in FIG. 8.

In some embodiments, one operator can control more than one mobile robot 10. In such embodiments notifying the operator for crossing the road not on the instant the traffic light changes can be advantageous as it can provide to the operator time for planning which mobile robot to operate. It can also provide time to the operator for switching control from one mobile robot to the other. This may decrease or avoid the delay between the time the light of the traffic light goes green and the time the mobile robot starts crossing the road, which contributes on a faster arrival at the destination.

In yet some other embodiments, wherein the mobile robot 10 is configured to predict the traffic light state change of an intersection based on patterns between said intersection and other intersection, said prediction can be used to determine a shortest time route. For example, reference is made to the multiple intersection scenario of FIG. 6. Assume the mobile robot 10 is required to go at intersection 12 (it is initially positioned at intersection 2). It is clear that multiple routes are possible. For example, one route can be via intersections 6, 10, 11, 12. Another route can be 3, 7, 8, 12. Yet another route can be 1, 5, 9, 10, 11, 12. Based on distance some routes are longer than some other routes, for example, route 1, 5, 9, 10, 11, 12 is longer than 6, 10, 11, 12. Yet some other routes can have the same length, for example, 6, 10, 11, 12 and 3, 7, 8, 12. However it can be that a longer route take less time than a shorter route taking into consideration the states of the traffic lights on each intersection. For example, it can happen that in the route 1, 5, 9, 10, 11, 12 all the traffic lights would be green for the mobile robot while on the other root 6, 10, 11, 12 all the traffic lights will be red for the mobile robot. Thus, the first route though longer can result in shorter time.

Thus, in some embodiments, the states of the traffic lights on intersections of the operating area (such as depicted in FIG. 6) can be predicted. Further the time the robot would have to wait for every route at each intersection can be estimated. Based on said estimated time and the known pattern of the state changes of the traffic lights of the intersections a shortest time path to arrive to a destination can be calculated (i.e. the path that would require the least time).

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, preferred embodiments have been described with reference to the accompanying drawings, the skilled person will understand that these embodiments were provided for illustrative purpose only and should by no means be construed to limit the scope of the present invention, which is defined by the claims.

The invention claimed is:
1. A method comprising:
 a first mobile robot driving, wherein the first mobile robot comprises a first camera system;
 the first camera system capturing a plurality of images of a first traffic light; and
 a data processing device:
  determining occurring states of the first traffic light based on the plurality of images of the first traffic light;
  determining a time of an occurring state change of the first traffic light based on the determined occurring states of the first traffic light; and predicting a time for a future state change of the first traffic light based on the time of the occurring state change of the first traffic light, wherein the method further comprises:
notifying an operator terminal of the future state change before the predicted time of the future state change; and
handing over operation of the robot to a human operator based on the predicted time for the future state change of the first traffic light.

2. The method according to claim 1, wherein the method comprises:
capturing a plurality of images of a second traffic light; and
the data processing device;
determining occurring states of the second traffic light based on the plurality of images of the second traffic light; and
determining a time of an occurring state change of the second traffic light based on the determined occurred states of the second traffic light,
predicting the time for the future state change of the first traffic light based on the time of the occurring state change of the second traffic light, and
wherein the first traffic light is located on a first crossing.

3. The method according to claim 2, wherein the second traffic light is located on the first crossing.

4. The method according to claim 2, wherein the second traffic light is not located on the first crossing.

5. The method according to claim 2,
wherein the method comprises a second mobile robot driving, and
wherein the second mobile robot comprises a second camera system, wherein the plurality of images of the second traffic light are captured by the second camera system.

6. The method according to claim 1, wherein the future state change of the first traffic light is a state change of the first traffic light from a state prohibiting the first mobile robot from crossing a road to a state allowing the first mobile robot to cross the road.

7. The method according to claim 1, wherein the method comprises altering a route of the first mobile robot in response to the predicted time for the future state change of the first traffic light.

8. The method according to claim 1, wherein the method comprises:
determining a first pattern of time delays between occurring state changes of the first traffic light based on the plurality of images of the first traffic light,
predicting the time for the future state change of the first traffic light based on the first pattern.

9. The method according to claim 8, wherein the first pattern is time dependent.

10. A system comprising:
a first mobile robot configured to drive, wherein the first mobile robot comprises a first camera system;
the first camera system configured to capture a plurality of images of a first traffic light;
a data processing device configured to:
determine occurring states of the first traffic light based on the plurality of images of the first traffic light;
determine a time of an occurring state change of the first traffic light based on the determined occurring states of the first traffic light;
predict a time for a future state change of the first traffic light based on the time of the occurring state change of the first traffic light; and
an operator terminal,
wherein the system is configured to:
notify the operator terminal of the future state change before the predicted time of the future state change, and
hand operation of the robot to a human operator based on the predicted time for the future state change of the first traffic light.

11. The system according to claim 10, wherein the data processing device is configured to:
determine occurring states of a second traffic light based on a plurality of images of the second traffic light; and
determine a time of an occurring state change of the second traffic light based on the determined occurred states of the second traffic light; and
predict the time for the future state change of the first traffic light based on the time of the occurring state change of the second traffic light, and
wherein the first traffic light is located on a first crossing.

12. The system according to claim 11, wherein the second traffic light is located on the first crossing.

13. The system according to claim 11, wherein the second traffic light is not located on the first crossing.

14. The system according to claim 11, wherein
the system comprises a second mobile robot configured to drive, and wherein
the second mobile robot comprises a second camera system, and wherein
the second camera system is configured to capture the plurality of images of the second traffic light.

15. The system according to claim 10, wherein the future state change of the first traffic light is a state change of the first traffic light from a state prohibiting the first mobile robot from crossing a road to a state allowing the first mobile robot to cross the road.

16. The system according to claim 10, wherein the system is configured to alter a route of the first mobile robot in response to the predicted time for the future state change of the first traffic light.

17. The system according to claim 10, wherein the data processing device is configured to:
determine a first pattern of time delays between occurring state changes of the first traffic light based on the plurality of images of the first traffic light, and
predict the time for the future state change of the first traffic light based on the first pattern.

18. The system according to claim 17, wherein the first pattern is time dependent.

* * * * *